United States Patent
Sarlashkar et al.

(10) Patent No.: US 11,654,913 B2
(45) Date of Patent: May 23, 2023

(54) VEHICLE CONTROL BASED ON INFRASTRUCTURE AND OTHER VEHICLES

(71) Applicant: Southwest Research Institute, San Antonio, TX (US)

(72) Inventors: Jayant V. Sarlashkar, San Antonio, TX (US); Sankar B. Rengarajan, San Antonio, TX (US); Scott R. Hotz, Pinckney, MI (US); Stanislav A. Gankov, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 147 days.

(21) Appl. No.: 17/249,545

(22) Filed: Mar. 4, 2021

(65) Prior Publication Data

US 2022/0281455 A1 Sep. 8, 2022

(51) Int. Cl.
| | |
|---|---|
| *B60W 40/105* | (2012.01) |
| *B60W 40/107* | (2012.01) |
| *B60W 40/04* | (2006.01) |
| *B60W 30/18* | (2012.01) |
| *B60W 30/095* | (2012.01) |

(52) U.S. Cl.
CPC .. *B60W 30/18159* (2020.02); *B60W 30/0956* (2013.01); *B60W 30/18163* (2013.01); *B60W 40/04* (2013.01); *B60W 40/105* (2013.01); *B60W 40/107* (2013.01); *B60W 2554/4041* (2020.02); *B60W 2554/802* (2020.02); *B60W 2556/65* (2020.02)

(58) Field of Classification Search
CPC ....... B60W 30/18159; B60W 30/0956; B60W 30/18163; B60W 40/04; B60W 40/105; B60W 40/107; B60W 2554/4041; B60W 2554/802; B60W 2556/65

See application file for complete search history.

(56) References Cited

U.S. PATENT DOCUMENTS

| | | | |
|---|---|---|---|
| 9,645,577 B1* | 5/2017 | Frazzoli | B60W 30/00 |
| 2016/0229409 A1* | 8/2016 | Pascheka | B60W 30/18154 |
| 2016/0231746 A1* | 8/2016 | Hazelton | G05D 1/0274 |
| 2018/0057004 A1* | 3/2018 | Muldoon | B60W 30/1886 |
| 2018/0319400 A1* | 11/2018 | Klei | H04W 4/46 |
| 2020/0307563 A1* | 10/2020 | Ghafarianzadeh | G06V 20/58 |
| 2021/0009128 A1* | 1/2021 | Jokela | B60W 30/18163 |
| 2021/0171040 A1* | 6/2021 | Grubwinkler | G01C 21/3605 |

(Continued)

OTHER PUBLICATIONS

Barik, et al., "Optimal velocity Prediction for Fuel Economy Improvement of Connected Vehicles", Intelligent Transport Systems, vol. 12, Issue 10, The Institution of Engineering and Technology Journal, 2018, pp. 1329-1335.

(Continued)

*Primary Examiner* — Peter D Nolan
*Assistant Examiner* — Ashley L Redhead, Jr.
(74) *Attorney, Agent, or Firm* — Grossman, Tucker, Perreault & Pfleger, PLLC

(57) ABSTRACT

Vehicle controller circuitry for a subject vehicle to determine vehicle constraints including predicted values for vehicle speed of at least one other vehicle and predicted values of for vehicle position of the at least one other vehicle relative to the subject vehicle, wherein the vehicle constraints are determined at predetermined time steps (k) over a time horizon (Th).

26 Claims, 7 Drawing Sheets

(56) References Cited

U.S. PATENT DOCUMENTS

| | | | |
|---|---|---|---|
| 2021/0276594 A1* | 9/2021 | Oh | G06N 3/0472 |
| 2022/0009491 A1* | 1/2022 | Taruoka | B60W 30/18154 |
| 2022/0024461 A1* | 1/2022 | Takei | G08G 1/0133 |
| 2022/0242394 A1* | 8/2022 | Koti | B60W 20/12 |

OTHER PUBLICATIONS

Prepared by the U.S. Energy Information Administrasion, "Study of the Potential Energy Consumption Impacts of Connected and Automated Vehicles", 2017, 06 pages.

\* cited by examiner

VEHICLE CONTROL BASED ON INFRASTRUCTURE AND OTHER VEHICLES

STATEMENT OF GOVERNMENT FUNDING

This invention was made with government support under contract DE-AR0000837, project 22627, awarded by the US Department of Energy, Advanced Research Project Agency-Energy (ARPA-E). The government may have certain rights in the invention.

TECHNICAL FIELD

The present disclosure relates to systems and methods for determining vehicle control based on infrastructure and other vehicles.

BACKGROUND

Humans are good drivers when it comes to anticipating and reacting to the behavior of nearby vehicles and assessing the safety of the environment. Nevertheless, all drivers operate with an information gap: a level of uncertainty that limits vehicle energy efficiency. Safe driving demands that drivers leave appropriate space between vehicles and cautiously approach intersections, because one can never completely anticipate the intentions of nearby vehicles and traffic conditions. The increased development of connected and automated vehicle systems, currently used mostly for safety and driver convenience, presents new opportunities to improve the energy efficiency of vehicles. Onboard sensing and external connectivity using Vehicle-to-Vehicle (V2V), Vehicle-to-Infrastructure (V2I), and Vehicle-to-Everything (V2X) technologies allows a vehicle to "know" its future operating environment with some degree of certainty, greatly narrowing prior information gaps.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
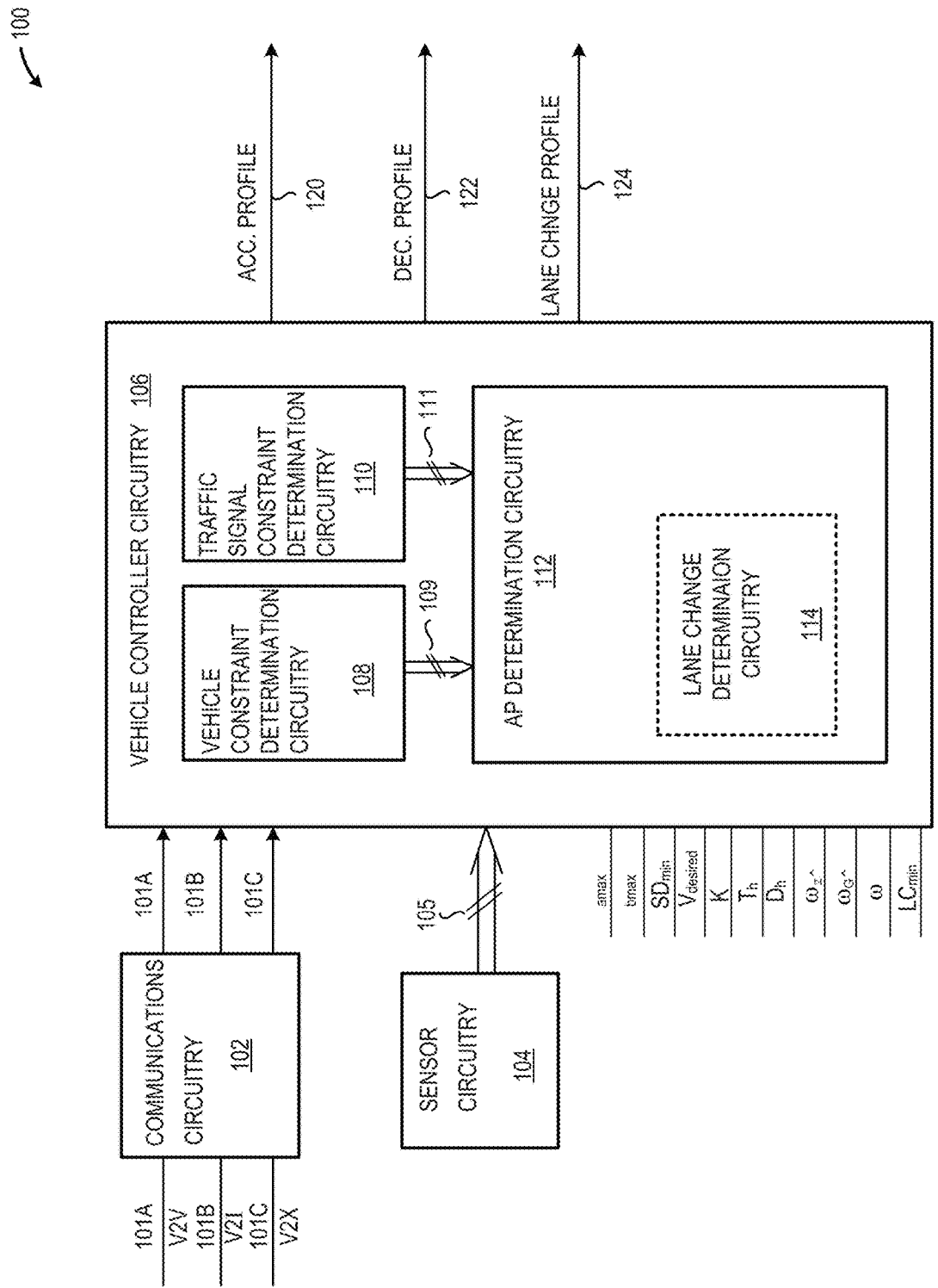
FIG. 1 illustrates a vehicle control system in accordance with several embodiments of the present disclosure.

FIG. 1 illustrates a vehicle control system 100 in accordance with several embodiments of the present disclosure. By way of background, the vehicle control system 100 may be incorporated with a fully autonomous (e.g., Level 5), semi-autonomous (e.g., Level 1-4) and/or manual (e.g., Level 0, strictly human-controlled) subject vehicle such as a car, truck, motorcycle, scooter, and/or other road vehicle types and/or off-road vehicle types. The subject vehicle may also typically include powertrain systems (for acceleration, not shown, which may include a motor, a transmission, a drive train, one or more axles, and associated linkage), braking systems (not shown), computer controls (not shown) and display systems (not shown), and other systems found in most vehicles. The vehicle control system 100 includes communication circuitry 102 generally configured to exchange commands and/or data with one or more vehicles, one or more traffic signals, and/or one or more other roadway objects (such as buildings, construction markers, hazardous conditions markers, etc.). The vehicle control system 100 also includes vehicle sensor circuitry 104 generally configured to determine "situational awareness" information of the area surrounding a vehicle. The vehicle control system 100 also includes vehicle control circuitry 106 generally configured to generate acceleration and/or deceleration profiles for the subject vehicle to provide an energy efficient speed trajectory based on constraints imposed by other vehicles, constraints imposed by infrastructure (e.g., traffic signals, road work signals, etc.), and/or system input constraints, as will be described in detail below.

The communication circuitry 102, in one embodiment, may comply or be compatible with a dedicated short-range radio (DSRC) communication protocol to enable exchange of commands and/or data with one or more vehicles and/or one or more traffic signals. The DSRC communication protocol may enable communication with other vehicles and/or infrastructure using standardized and/or customizable data streams, and in some embodiments The DSRC communication protocol may have a communications coverage radius of approximately 500 meters. Of course, in other embodiments, the communication circuitry 102 may operate in accordance with any conventional, proprietary, and/or after-developed short-range, intermediate-range and/or long-range communication protocol (e.g., cellular communications protocols, radio frequency communication protocols, WiFi communication protocols, etc.). In one embodiment, the communications circuitry 102 is configured to receive a vehicle-to-vehicle (V2V) data stream 101A from at least one other vehicle within range of the DSRC communication protocol. The V2V data stream 101A may comply or be compatible with an SAEJ2735 data formatting protocol, and/or other standardized and/or proprietary data formatting protocol. Generally, the V2V data stream 101A includes vehicle speed (velocity) and position data of a vehicle, and may also include vehicle identification data, vehicle characteristics data and/or other data such as, for example, vehicle acceleration data. The speed data may include relative speed data (e.g., relative to other vehicles, etc.) and/or absolute speed data (e.g., speed relative to an at-rest position ground position). The position data may include absolute position data (e.g., GPS coordinate position data of a vehicle on a road, mapped position data, etc.) and/or relative position data (e.g., position relative to known infrastructure, shared waypoints, road markers, position relative to other vehicles, etc.).

In one embodiment, the communications circuitry 102 is also configured to receive a vehicle-to-infrastructure (V2I) data stream 101B from at least one roadway infrastructure transmitter within range of the DSRC communication protocol. In the context of embodiments described herein, the roadway infrastructure V2I data stream 101B includes data from at least one traffic signal, however, in other embodiments, the roadway infrastructure V2I data stream 101B may be generated by other stationary and/or mobile roadway infrastructure such as construction markings, buildings, etc. The V2I data stream 101B may comply, or be compatible with, with the SAEJ2735 data formatting protocol, and/or other standardized and/or proprietary data formatting protocol. Generally, and assuming that the V2I data stream 101B is generated by a traffic signal, the V2I data stream 101B generally includes traffic signal position data, traffic signal state data, and may also include traffic signal identification data, traffic signal characteristics data and/or other data. The traffic signal state data may include, for example, a time in a green light state (Tgl), a time remaining in a green light state (Trgl), a time in red light state (Trl), and a time remaining in a red light state (Trrl). The time in green light state (Tgl) may include the time in a yellow state.

In other embodiments, the communication circuitry 102 may also be configured to receive a vehicle-to-everything (V2X) data stream 101C which may include information related to future and/or anticipated environmental conditions of a roadway. The V2X data stream 101C may comply, or be compatible with, with the SAEJ2735 data formatting protocol, and/or other standardized and/or proprietary data formatting protocol. The communication circuitry 102 may also be configured to transmit the data streams (101A, 101B, and/or 101C) to the vehicle controller circuitry 106 to determine acceleration and/or deceleration profiles, as described below.

The vehicle sensor circuitry 104, in some embodiments, may include a plurality of sensors to determine various operating characteristics of the vehicle and may also include a plurality of sensors to determine roadway and/or traffic conditions. For example, the vehicle sensor circuitry 104 may include one or more speed (velocity) sensors to determine an instantaneous speed (Vo) of the subject vehicle, and one or more accelerometers to determine an instantaneous acceleration/deceleration (ao) in at least one axis (e.g., acceleration/deceleration along the axis of travel, acceleration/deceleration normal to the axis of travel, etc.), etc.

The vehicle sensor circuitry 104 may also include one or more sensors to determine roadway and/or traffic conditions. Such sensors may include, for example, LIDAR/RADAR-based sensors to determine a distance to another vehicle or object in front, behind and/or next to the subject vehicle, visual and/or infrared sensors to determine roadway conditions (e.g., potholes, broken pavement, etc.) and/or environmental conditions of the roadway (e.g., snow/ice on the road, wet road, etc.). In addition, any one of the sensors (or a combination thereof) may be used to generate emergency override signals in the event of a sudden change in traffic conditions (for example, an adjacent vehicle suddenly changes lanes, an unknown object/vehicle/person enters the roadway, etc.) which may be used to generate emergency acceleration/deceleration and/or steering control signals to avoid an accident. In some embodiments, the sensor circuitry 104 may include global positioning system (GPS) circuitry to receive GPS data from one or more satellites, and such GPS data may include, for example, vehicle position, real-time or near-real time traffic conditions, mapping, velocity, acceleration, and/or distance of surrounding vehicles, roadway speed limits, etc. Vehicle sensor circuitry 104 may generate one or more sensor control signals 105, such as, for example, a vehicle velocity feedback signal, vehicle acceleration feedback signal, distance to a vehicle-in-front signal, a distance to a vehicle behind signal and/or override signals, etc. The sensor control signals 105 may be utilized by the vehicle controller circuitry 106, as described below, to generate efficient acceleration and/or deceleration profiles.

As a general overview, the vehicle control circuitry 106 is configured to determine, at predefined steps over a given time interval, an efficient acceleration/deceleration profile for the subject vehicle based on constraints imposed by other vehicles, constraints imposed by traffic signals, and also based on system inputs. The vehicle control circuitry 106 may generate efficient acceleration/deceleration profiles to enable the subject vehicle to accelerate and decelerate on a roadway so that the following criteria are met: 1) the subject vehicle achieves a desired speed and avoids collisions with other vehicles, 2) the subject vehicle can safely pass through a green light, if able, and 3) the subject vehicle can safely stop at a red light if unable to pass through a green light.

System Inputs

System inputs may comprise user-selectable, preset, and/or programmable parameters to vehicle controller circuitry 106. One example system input includes a step value (k), which represents the number of acceleration/deceleration values of an acceleration profile, determined by vehicle controller circuitry 106, over a given time horizon. As an example, if the value of k is equal to 20, the vehicle controller circuitry 106 determines 20 values in an acceleration/deceleration profile over a given time horizon. Of course, other values of k may be selected based on, for example, the computational efficiency of the vehicle controller circuitry 106, a desired responsiveness for acceleration/deceleration, and/or other operational or engineering tolerances which may influence a selected value for k, etc. In some embodiments, the value of k may be a fixed time value, for example, 500 msec., etc., and the fixed time value is applied evenly over a given time horizon. In other embodiments, the value of k may be scaled and/or weighted to velocity and/or acceleration of the subject vehicle. For example, as velocity and/or acceleration increases, the time value of k may increase to enable more determinations of acceleration/deceleration values of an acceleration profile in a given time horizon.

Other example system inputs to vehicle controller circuitry 106 include a time horizon (Th) input and a distance horizon (Dh) input. The time horizon input (Th) generally represents the time interval for which the vehicle controller circuitry 106 determines acceleration/deceleration values in an acceleration/deceleration profile. For example, the value of Th may be selected as 10 sec., and with a k value of 20, the vehicle controller circuitry 106 is configured to determine acceleration/deceleration profiles that have 20 acceleration/deceleration values, at each 500 ms. increment, for the next 10 sec. Of course, this is only an example value for Th, and in some embodiments the value of Th may be greater or less than 10 sec., depending on, for example, a desired granularity of traffic conditions, computational efficiency and/or memory capacity of vehicle controller circuitry 106, and/or other operational or engineering tolerances which may influence a selected value for Th, etc. The distance horizon input (Dh) is generally defined by the range of the communication circuitry 102. In the example above, a range of 500 meters indicates that the vehicle controller circuitry 106 determines acceleration/deceleration profiles based on vehicle constraints (from information in the V2V data stream 101A and/or sensor circuitry control inputs 105) and traffic signal constraints (from information in the V2I data stream 101B) that are within 500 meters from the subject vehicle. Of course, this is only an example value for Dh, and in some embodiments the value of Dh may be greater or less than 500 meters, depending on, for example, a desired granularity of traffic conditions, computational efficiency and/or memory capacity of vehicle controller circuitry 106, signal strength of the V2V/V2I/V2x data streams, range of communication circuitry 102, environmental conditions that may limit the range of communication circuitry 102, and/or other operational or engineering tolerances which may influence a selected value for Dh, etc.

Other example system inputs to vehicle controller circuitry 106 include a maximum acceleration (amax) and a maximum braking capacity (bmax). The value of amax is generally the upper limit of acceleration defined by the physics of the subject vehicle, for example, the maximum acceleration that the motor/powertrain of the subject vehicle can achieve. The value of bmax is generally the upper limit of stopping power, also defined by the physics of the subject vehicle, for example, how fast the braking system can stop the subject vehicle. Another example system input to vehicle controller circuitry 106 may include a minimum safe distance (SDmin) that generally represents the minimum distance that the subject vehicle should keep between itself and a vehicle-in-front (VIF), where the VIF is the vehicle directly in front of the subject vehicle. SDmin may be considered as a safety measure to enable collision avoidance with the VIF, and therefore SDmin may operate as a constraint on speed and acceleration/deceleration of the subject vehicle. In some embodiments, the value of SDmin may be scaled with velocity of the subject vehicle, meaning that as velocity increases, SDmin may also increase to enable the subject vehicle sufficient time to stop in an emergency. In some embodiments, the distance to the VIF may be determined via sensor circuitry 104 and compared to SDmin to provide speed and/or acceleration/deceleration constraints on the subject vehicle.

Another example system input to vehicle controller circuitry 106 includes a desired velocity (Vdesired), as may be determined by a driver and/or passenger of the subject vehicle. In some embodiments, Vdesired may match a roadway speed limit. In these embodiments, a roadway speed limit may be determined, for example, using GPS sensor data and/or visual sensor data (for example, by imaging and interpreting a speed limit roadway sign). In some embodiments, Vdesired may also include a tolerance value to permit, for example, the subject vehicle to exceed a given roadway speed limit by the tolerance value. For example, if the tolerance value of Vdesired is 2%, the subject vehicle may be permitted to exceed a posted speed limit by 2%. In some embodiments, Vdesired may also include tolerance values based on the type of roadway being traveled by the subject vehicle. For example, Vdesired may include a tolerance value of 2% in city traffic and/or congested traffic scenarios, and 5% for highway travel. In some embodiments, Vdesired may also include a desired speed for daytime travel, and a desired speed for night travel.

Another example system input to vehicle controller circuitry 106 may include a minimum lane change distance (LCmin). LCmin may specify how "fast" a lane change may occur. The value of LCmin may be determined by a driver and/or passenger of the subject vehicle and/or roadway constraints, etc. For example, a large value for LCmin may indicate that the driver/passenger wants lane changing to occur relatively slowly, as compared to smaller values of LCmin. LCmin may also be selected to avoid excessive lateral acceleration when changing lanes (which may be perceived by a driver/passenger as a "jerky" ride). In some embodiments, the value of LCmin may scale with velocity of the subject vehicle so that, for example, LCmin increases as velocity increases and decreases as velocity decreases.

As will be described in greater detail below, other example system inputs to vehicle controller circuitry 106 include an acceleration weighting factor, $\omega$, a green light acceleration weighting factor, $\omega_{GL}$, and a red light acceleration weighting factor, $\omega_{RL}$. The value of the acceleration weighting factor, $\omega$, generally provides an indication of a "cost" associated with acceleration, and may be used to determine a minimum cost associated with acceleration. The value of $\omega_{GL}$ may be indicative of a user tolerance for increased acceleration if attempting to determine an acceleration profile that enables the subject vehicle to pass through a green light, while the value of $\omega_{RL}$ may be indicative of a decreased user tolerance on braking (negative acceleration) when the subject vehicle must stop for a red light.

Vehicle Constraints

The vehicle controller 106 includes vehicle constraint determination circuitry 108 to determine vehicle constraints 109 that may be imposed by one or more other vehicles within the distance horizon (Dh) of the subject vehicle, at each time step k over the time horizon (Th). Constraints imposed by other vehicles may influence velocity and/or acceleration/deceleration for the subject vehicle. The vehicle constraint determination circuitry 106 is configured to receive the V2V data stream 101A and/or one or more control signals 105 to determine the number of vehicles in front of the subject vehicle, the speed of each vehicle, and a position of each vehicle relative to the subject vehicle. In some embodiments, the number of vehicles within the Dh may be determined directly from the V2V data stream that is broadcast from other vehicles (for example, each vehicle may broadcast a V2V data stream having a unique identifier, thus enabling circuitry 108 to count the number of vehicles within Dh). In other embodiments, GPS sensor circuitry data may be used to determine the number of vehicles within Dh. In still other embodiments, both the V2V data stream and GPS data may be used to determine the number of vehicles within Dh, thus enabling, for example, a more accurate determination when there are legacy vehicles on the road that do not broadcast a V2V data stream.

Since the VIF may impose more immediate constraints on the subject vehicle, vehicle constraint determination circuitry 108 may determine a vehicle constraint profile (VCP$_k$) for the VIF that includes velocity and position of the VIF at each k time step increment over Th. In other words, at each time step k, the vehicle constraint determination circuitry 108 may determine VCP$_k$ that forms a matrix having vehicle velocity and position at each time step k over Th. It should be noted that a given VCP$_k$ at a time step k may include velocity and position data that has been determined in a previous time step (e.g., k−1).

For the first time step (k=1), an actual velocity and position of the VIF may be determined by information in a V2V data stream 101A from the VIF and/or sensor information (e.g. LIDAR/RADAR sensor, GPS sensor, etc.). Each time step beyond the current time step (k=1) is "forward looking", meaning that subsequent time steps are looking into the future to establish velocity and position of the VIF. Accordingly, in some embodiments, for each time step beyond the first time step, the velocity and position of the VIF may be "estimated" or "predicted" based on an "estimated" or "predicted" velocity and position of vehicles in front of the VIF. For time steps beyond the first time step, the vehicle constraint determination circuitry 108 may utilize conventional and/or proprietary propagation methodologies (for example, the Gipps propagation methodology) to predict or estimate VVIF and DVIF. In an example propagation methodology, a velocity and speed of a lead vehicle, within Th, may first be determined. The velocity and speed of the lead vehicle (i.e., the furthest vehicle from the subject vehicle within Dh) may be determined by information in a V2V data stream 101A from the lead vehicle and/or sensor information (e.g. LIDAR/RADAR sensor, GPS sensor, etc.). Based on actual velocity and speed of the lead vehicle, the velocity and speed of each vehicle behind the lead vehicle may be estimated or predicted, at each subsequent time step, by "propagating back" an estimation of speed of each vehicle behind the lead vehicle, until the VVIF is determined. A prediction of each DVIF, at each subsequent time step beyond the first time step, may be determined based on a corresponding predicted VVIF.

With actual velocity and position data determined at the first time step, and predicted velocity and position data determined for subsequent time steps, the vehicle constraint determination circuitry 108 may generate a $VCP_k$ for the VIF at each time step k, over Th. Estimation of velocity and position may provide a more accurate assessment of the velocity behavior of the VIF, for example, if a vehicle in front of the VIF is going slower than other vehicles (which would, in turn, presumably constrain the speed of the VIF). Depending on the initial speed of the lead vehicle, it may be assumed that the lead vehicle will travel at the maximum allowable speed limit (or the furthest lead vehicle can be assumed to continue at its current speed) and that this speed will be propagated for each other vehicle through Th. On the other hand, if the lead vehicle is below the maximum speed limit, this may indicate a condition/event imposed on the lead vehicle (e.g., slowing for a traffic signal, slowing for other vehicles outside of Dh, emergency braking, etc.), and the speed of the other vehicles within Dh may be estimated to slow down accordingly.

By way of example, and assuming k=20 and Th=10 sec., at the first time step (k=1), the vehicle constraint determination circuitry 108 may determine an actual velocity and position of the VIF relative to the subject vehicle (VVIF and DVIF, respectively), based on V2V data stream information 101A and/or vehicle sensor information 104. Since subsequent time steps are "future looking", VVIF and DVIF for each subsequent time increment (k=2:20) may be "predicting" or "estimated" using, for example, propagation methodologies described above. In this manner, the vehicle constraint determination circuitry 108 determines $VCP_k$ at each time step k. It may be appreciated that in the next time step increment, a new $VCP_k$ may be determined, which replaces the $VCP_k$ determined at the previous time step.

As stated, the vehicle constraint determination circuitry 108 may determine, at each time step k, a $VCP_k$ that includes distance and speed of the VIF (which may include actual and/or predicted values of position and speed of VVIF and DVIF). This may enable, for example, an updating "picture" of actual traffic conditions. For example, at any given time one or more of the vehicles may slow down, speed up, react to an emergency, turn off the roadway and/or other vehicles may enter the roadway. Thus, determining the distance and speed of each vehicle at each time step k may reduce or eliminate traffic condition errors, and thus reducing or eliminating chances for collisions with other vehicles.

Figure 2:
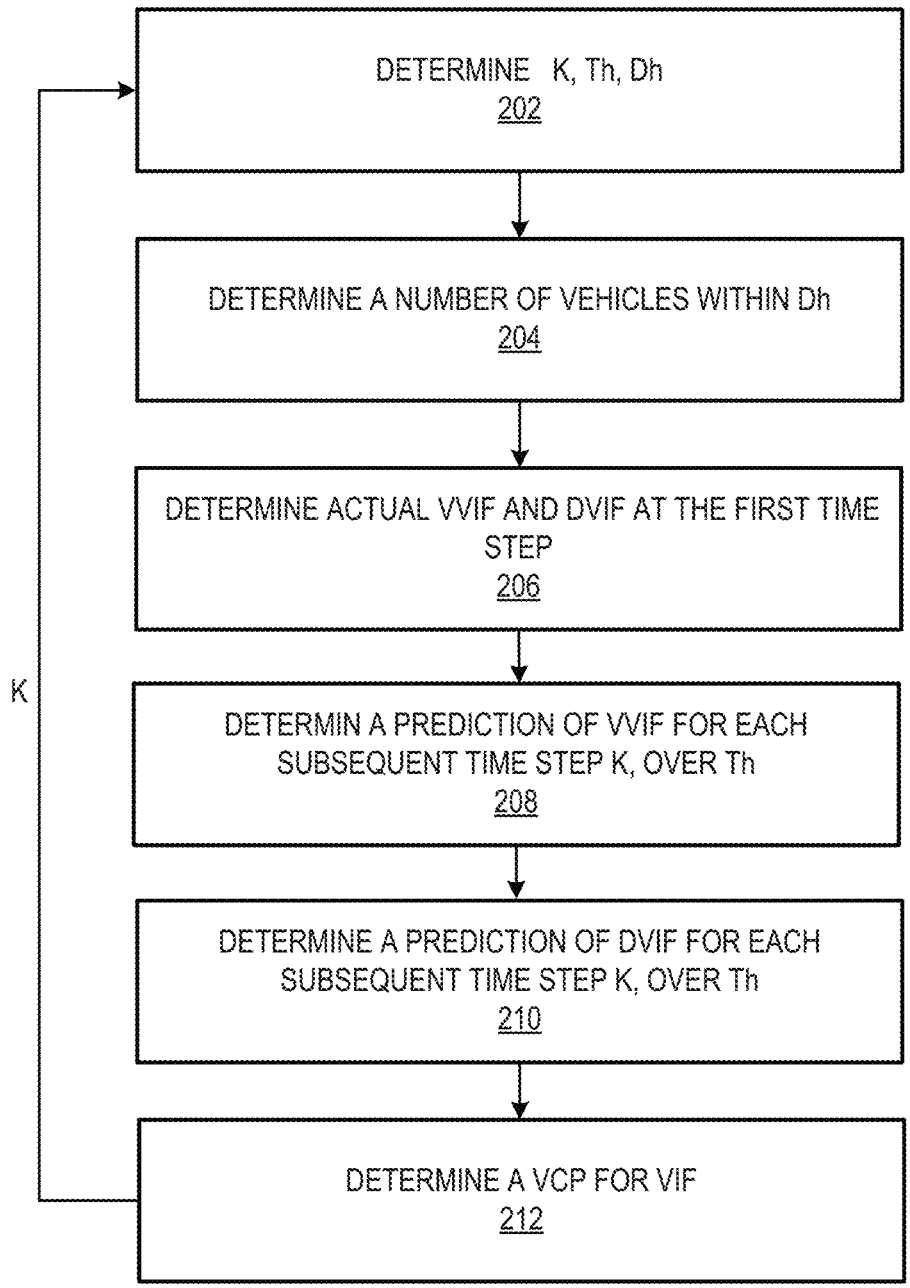
FIG. 2 illustrates a flowchart for determining vehicle constraints according to one embodiment of the present disclosure.

FIG. 2 illustrates a flowchart 200 for determining a vehicle constraint profile (VCP) according to one embodiment. Operations according to this embodiment include determining a time step size (k), a time horizon (Th) and a distance horizon (Dh) 202. Operations of this embodiment also include determining the number of other vehicles, in front of the subject vehicle, within Dh 204. In this embodiment, the number of other vehicles in front of the subject vehicle may be determined by parsing V2V and/or V2I data streams that may be broadcast by one or more other vehicles and/or using sensor information to count the number of other vehicles within Dh. Operations of this embodiment also include determining the actual values for VVIF and DVIF at a first time step 206. Operations of this embodiment also include determining a prediction of VVIF for each subsequent time step over Th 208. For example, the speed of each vehicle may be estimated using a propagation methodology (e.g., Gipps methodology) over Th, using a speed of a lead vehicle and propagating a speed for each vehicle behind the lead vehicle. As another example, speed information for each vehicle may be determined directly using broadcasted V2V information and/or sensor information. Operations of this embodiment also include determining a prediction of DVIF, relative to the subject vehicle, for each subsequent time step over Th 210. The prediction DVIF in each subsequent time step may be based on, for example, the corresponding prediction of VVIF. Operations of this embodiment also include determining a VCP for the VIF 212. Each of operations 202, 204, 206, 208, 210 and/or 212 may be repeated at each time step (k), to provide a continuously updated VCP determination.

Traffic Signal Constraints

Referring again to FIG. 1, the vehicle controller 106 includes traffic signal constraint determination circuitry 110, to determine traffic signal constraints 111 that may be imposed by one or more traffic signals within the distance horizon (Dh) of the subject vehicle, over Th. Constraints imposed by traffic signals may include, for example, the number of traffic signals within Dh, distance to each traffic signal within Dh (Dts), a time in a green light state for each traffic signal (Tgl), a time remaining in a green light state (Trgl) for each traffic signal, a time in red light state for each traffic signal (Trl), and a time remaining in a red light state (Trrl) for each traffic signal. The time in green light state for each traffic signal (Trgl) may include the time in a yellow state. The traffic signal constraints may influence velocity and/or acceleration/deceleration, along with the vehicle constraints and system inputs, to enable the subject vehicle to pass through a green light, if able, or to safely stop at a red light, as described more fully below.

The traffic signal constraint determination circuitry 110 is configured to receive the V2I data stream 101B and/or one or more sensor control signals 105 to determine the number N of traffic signals within Dh, a distance to each traffic signal (Dts1, Dts2, . . . , DtsN), a time in a green light state for each traffic signal (Tgl1, Tgl2, . . . , TglN), a time remaining in green for each traffic signal (Trgl1, Trgl2, . . . , TrglN), a time in red light state for each traffic signal (Trl1, Trl2, . . . , TrlN), and a time remaining in red for each traffic signal (Trrl1, Trr12, . . . , TrrlN), where the number 1 indicates the nearest traffic signal. The distance to each traffic signal within Dh may be determined, for example, using GPS sensor data 105 to obtain a location of the traffic signal relative to the subject vehicle, and determining a distance to the traffic signal. Dts, Tgl, Trgl, Trl and Trrl may be determined by parsing the V2I data stream 101B of each of the N traffic signals to determine these data values.

The traffic signal constraint determination circuitry 110 may determine a traffic signal constraint profile (TSCP$_k$) that generally forms a matrix that includes the traffic signal constraints of a distance to each traffic signal within Dh (Dts), a time in a green light state for each traffic signal (Tgl), a time remaining in a green light state (Trgl) for each traffic signal, a time in red light state for each traffic signal (Trl), and a time remaining in a red light state (Trrl) for each traffic signal. The TSCP$_k$ matrix may include each traffic signal constraint at each k time step increment over Th. Like the VCP$_k$ matrix described above, the TSCP$_k$ matrix is "forward looking" in that traffic signal constraint values beyond an initial time step are future values. In other words, an initial time step k includes the current traffic signal constraint values (which are given in distance or time), and each subsequent time step increment provides future values for the traffic signal constraints. Future distance values for Dts may be estimated, for example, based on an estimated velocity of the subject vehicle at corresponding future time steps. Future time values for Tglm Trgl, Trl and Trrl may be determined by "counting down", at each time step k, these traffic signal constraints by Th/k. It should be noted that a given TSCP$_k$ at a time step k may include traffic signal constraint data that has been determined in a previous time step (e.g., k−1).

By way of example, assume k=20, Th=10, and there is a single traffic signal within Th having initial constraints of: Dts=300 meters, Tgl=20 sec., Trgl=5 sec., Trl=20 sec., and Trrl=0 sec. The traffic signal constraint determination circuitry 110 may determine a TSCP$_k$ by including these initial traffic signal constraints for k=1. For k=2, the value of Dts may be estimated based on an estimation of velocity of the subject vehicle at k=2. Also at k=2, the time-value traffic signal constraints may be decremented by 500 ms. (Th/k). This may be repeated for each k values 3-20. The traffic signal constraint determination circuitry 110 may generate a TSCP$_k$ matrix.

The traffic signal constraint determination circuitry 110 may determine the TSCP$_k$ at each time step k. This may enable, for example, a more accurate assessment of the traffic signal constraints. For example, at a first time step, a traffic signal may be in a green state and have enough time remaining in green to enable the subject vehicle to pass through the green signal. In a subsequent step, the traffic signal may suddenly change to red, for example, as a result of an emergency vehicle crossing through the intersection of the traffic signal. Thus, determining the traffic signal constraints at each time step k may reduce or eliminate traffic errors resulting from changing traffic conditions, and thus reducing or eliminating chances for collisions with other vehicles. Since traffic signals may influence the speed of other vehicles, the traffic signal constraints may also influence the vehicle constraints.

Figure 3:
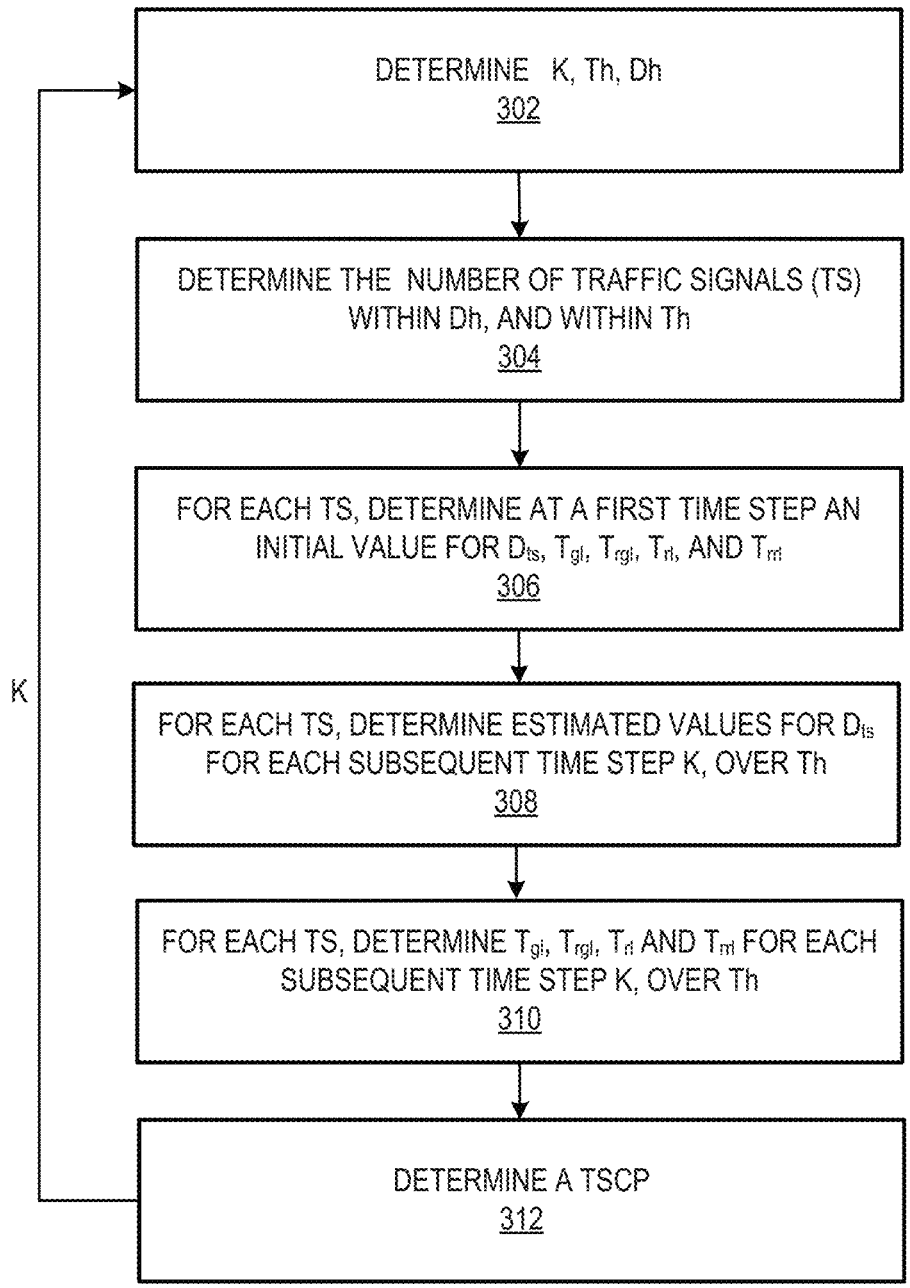
FIG. 3 illustrates a flowchart for determining traffic signal constraints according to one embodiment of the present disclosure.

FIG. 3 illustrates a flowchart 300 for determining traffic signal constraints profile (TSCP) according to one embodiment of the present disclosure. Operations according to this embodiment include determining a time step size (k), a time horizon (Th) and a distance horizon (Dh) 302. Operations of this embodiment also include determining the number of traffic signals (TS) in front of the subject vehicle within Dh and within Th 304. In this embodiment, the number of traffic signals (TS) in front of the subject vehicle may be determined by parsing one or more V2I data streams that may be broadcast by one or more traffic signals (TS) to count the number of traffic signals (TS) within Dh. For example, for traffic signals that broadcast a V2I data stream, each data stream may include a unique identifier to enable a "count" of V2I-enabled traffic signals. The number of such traffic signals within Th may be determined, for example, by estimating the velocity of the subject vehicle through Th and counting the number of traffic signals that may be encountered over the distance V/Th. Operations of this embodiment also include for each traffic signal, determining, at a first time step, an initial value for Dts, Tgl, Trgl, Trl, and Trrl 306. For example, a distance to each traffic signal may be determined, for example, using GPS data which may "map" roadway infrastructure, such as traffic signals, relative to the subject vehicle. Initial values for Tgl, Trgl, Trl, and Trrl, for each TS, may be determined by parsing each respective V2I data stream of each TS. Operations of this embodiment also include for each TS, determining estimated values for Dts for each subsequent time step over Th 308. Estimated values for Dts may be determined based on, for example, an estimation of velocity at a given subsequent time step. Operations of this embodiment also include for each TS, determining Tgl, Trgl, Trl and Trrl for each subsequent time step over Th 310. These values may be determined by, for example, decrementing each time value by Th/k at each time step k. Operations of this embodiment may also include determining a traffic signal constraint profile (TSCP) that includes Dts, Tgl, Trgl, Trl, and Trrl for each TS, and over Th 312. Any or all of operations 302, 304, 306, 308, 310, and/or 312 may be repeated at each time step (k), to provide a continuously updating determination of the traffic signal constraints.

Generalized Acceleration/Deceleration Profiles And Efficiency

Referring again to FIG. 1, the system 100 also includes vehicle controller circuitry 106 also includes acceleration profile (AP) determination circuitry 112. Generally, AP determination circuitry 112 is configured to determine efficient acceleration profiles 120 and/or deceleration profiles 122, at predefined time steps (k) and over the time horizon (Th), based on the vehicle constraints, traffic signal constraints and system inputs. In embodiments described herein, AP determination circuitry 112 is configured to determine efficient acceleration/deceleration profiles 120/122, and, accordingly, velocity profiles that satisfy one or more "efficiency goals". In the context of acceleration, example efficiency goals according to the teachings herein include passing through a green light without stopping, accelerating to a desired velocity (Vdesired) in a manner that achieves Vdesired in a minimized amount of time and with a minimized amount of acceleration, and accelerating to a desired velocity (Vdesired) in manner that avoids collisions with other vehicles. In the context of deceleration, example efficiency goals according to the teachings herein include decelerating so as to reduce or minimize impacts on surrounding vehicles.

A generalized form of an AP may be stated as a function of vehicle constraints, traffic signal constraints and system inputs. An example of a generalized AP form is given by Eq. 1 below:

$$AP = f(ao, Vo, amax, Vdesired, SDmin, DVIF, VVIF, Tgl, Trgl, Dts, Trl, Trrl, \omega) \quad \text{Eq. 1}$$

Where a0 is initial acceleration of the subject vehicle (e.g., at a discrete time when k=1), Vo is initial velocity of the subject vehicle (e.g., at a discrete time when k=1), amax is the maximum acceleration of the subject vehicle, Vdesired is the desired speed of the subject vehicle, SDmin is the minimum safe distance between the subject vehicle and a VIF (and/or other object on the road), DVIF and VVIF are the distance to the VIF from the subject vehicle and the speed of the VIF, respectively, Tgl1 is the time remaining in a green state for the nearest traffic signal, Dts1 is a distance from the subject vehicle to the nearest traffic signal, ω is a weighting factor applied to acceleration.

As stated, an AP is series of acceleration values determined at each time step k over Th. For example, in a discrete time determination and assuming k=20 and Th=10 sec., an AP is determined having 20 acceleration values over the next 10 seconds (e.g., one acceleration value at each 500 ms. time increment), and at each step of acceleration, a corresponding velocity of the subject vehicle may be determined. Thus, in discrete time an AP may be generalized as a [1×k] matrix, where each field in the matrix corresponds to an acceleration value at the $k^{th}$ step. An AP may be regarded as a prediction of acceleration values of the subject vehicle over the time horizon, where the acceleration values in the AP are generally upper-bounded by amax, and based on vehicle constraints, traffic signal constraints and system input constraints. As described above, the vehicle constraints and traffic signal constraints may be determined at each of k time steps over Th, to form a vehicle constraint profile at each time step k ($VCP_k$) and a traffic signal constraint profile at each time step k ($TSCP_k$). Accordingly, the generalized form of the AP may be revised as given by Eq. 2 below:

$$AP_k = f(ao, Vo, amax, Vdesired, SDmin, \omega, VCP_k, TSCP_k) \quad \text{Eq. 2}$$

As stated, an AP is a collection or series of acceleration values, one acceleration value at each time step k. At a first time step, an actual initial acceleration value may be determined, for example, using sensor circuitry 104. For subsequent time step over k, each acceleration value may represent an estimation of acceleration, based on the vehicle constraints and traffic signal constraints, and system inputs. Accordingly, acceleration at each time step k, beyond the first time step, may be given by Eq. 3 below:

$$a_{k+1} = a0 + f(Vo, amax, Vdesired, SDmin, \omega, VCP_k, TSCP_k) \quad \text{Eq. 3}$$

In at least one embodiment of the present disclosure, vehicle controller circuitry 106 may determine one or more APs using discrete-time matrix operations, where vehicle constraints and traffic signal constraints may be formed as discrete time matrices. For example, the time-domain solutions of determining acceleration curves to form an AP may be formulated in a discrete-time domain (over k) using conventional discrete-time optimization techniques (for example, qpOASES discrete time solver techniques) by linearizing vehicle constraints and traffic signal constraints in discrete-time matrices. Such linearization of constraints is necessary to maintain the problem as a quadratic program— quadratic cost with linear constraints—on the decision variable AP. The quadratic program is solvable in real-time using a solver such as qpOASES. The linearization is performed about the unconstrained AP (which may be determined without regard to surrounding vehicles or signals). Discrete-time matrix operations may be more computationally efficient than time-domain operations (which may involve unbounded and/or higher order partial differential equations), and thus, discrete-time operations may offer enhanced safety while reducing processing requirements and/or memory requirements. Of course, in other embodiments and depending on the computational efficiency of vehicle controller circuitry 106, the one or more APs may be determined in the time domain.

As a general matter, there is an energy cost associated with acceleration. Therefore, according to the teachings herein, the AP determination circuitry 112 is also configured to determine a minimum cost/penalty by determining an AP, among a plurality of potential APs, that generates the lowest cost while achieving a given goal, i.e., achieving Vdesired in the least amount of time that also minimizes acceleration, passing through a green light, if able, etc. Therefore, "efficient", as used herein in the context of an AP, is generally defined as an AP that provides a minimum cost/penalty, compared to other potential APs, while achieving these stated goals. The cost/penalty may reflect an energy consumption metric, for example, gas/diesel consumption, battery current usage, etc. It should be noted that "efficient", as defined herein, does not necessarily mean an absolute lowest value, but rather a minimum value that can achieve stated goals. To determine an efficient AP, the AP determination circuitry 112 is generally configured to determine a cost/penalty of acceleration and velocity of the subject vehicle that is summed over k number of values. The generalized discrete-time cost/penalty function may be given by Eq. 4 below:

$$J = a_0^2 + \sum_{k=1}^{kN}(\omega a_k^2) + (v_k - v^*)^2 \quad \text{Eq. 4}$$

Where $a_0$ is the initial acceleration of the subject vehicle; $a_k$ is the acceleration value at each time step, k, where the collection of acceleration values form an acceleration profile (AP). ω is a weighting factor applied to acceleration $a_k^2$; $v_k$ is the velocity of the subject vehicle at each time step k; v* is the upper bound of velocity for the subject vehicle. N is the number of time steps. The upper bound of velocity may be the roadway speed limit, Vdesired, and/or the speed of the VIF. J is the cost/penalty for acceleration and velocity, summed over the number of time steps, k.

As may be appreciated from Eq. 4, there is a cost/penalty associated with acceleration (the $\omega a_k^2$ term) and with the subject vehicle not traveling at v* (in other words when $v_k - v^* \neq 0$). However, an energy cost associated with acceleration is generally larger than an energy cost associated with velocity. Therefore, in some embodiments, a scalar weighting factor ω may be applied to acceleration to reflect an increased cost/penalty of acceleration. In some embodiments, the weighting factor ω may be selected to be any non-zero, non-negative value (for example 0.01<ω<50), where increasing values of ω has the effect of increasing a cost associated with acceleration, and decreasing values of ω has the effect of decreasing a cost associated with acceleration. This, in turn, may have the effect of decreasing or increasing acceleration values of an AP. For example, for a first cost/penalty function J1 determined using a first weighting factor ω1 to be equal to a second cost/penalty function J2 determined using a second weighting factor ω2, where ω1<ω2, the acceleration values of the first cost/penalty function J1 are larger than the acceleration values of the second cost/penalty function J2.

The effect of the weighting factor on acceleration may also reflect a driver preference. For example, the weighting factor ω may be selected based on overall driver/passenger comfort and/or ride tolerances. While driver/passenger comfort and/or ride tolerances are generally subjective, the inventors herein have determined that a weighting factor ω of between 6 and 8 provides acceleration values that most drivers/passengers would subjectively deem as a "comfortable" or "smooth" ride in terms of acceleration. In some embodiments, the value of weighting factor ω may be fixed for a given subject vehicle. In other embodiments, weighting factor ω may be user/driver selectable, so that a driver can select more or less aggressive acceleration. As noted above, in some embodiments, a green light acceleration weighting factor, $\omega_{GL}$, may be used as the weighting factor for acceleration, where $\omega_{GL}$ may be smaller than weighting factor ω, to indicate the driver may tolerate greater acceleration to safely pass through a green light. Similarly, a red light weighting factor, $\omega_{RL}$, where $\omega_{RL}$ may be smaller than weighting factor ω, may be used as the weighting factor for deceleration to indicate that the driver may have an increased tolerance for braking (e.g., "hard braking") when stopping for a red light.

Determining Acceleration/Deceleration Profiles On a Roadway With Traffic Signals For the following description, assume that a single-traffic signal is detected within Dh, and that the detected traffic signal is in a green state. The AP determination circuitry 112 may initially determine an initial feasibility of passing through the green traffic signal based on the traffic signal constraints (described above) and based on amax, Vdesired, a current velocity (V0) and a current acceleration (ao). In this regard, the AP determination circuitry 112 determines if the subject vehicle can reach the traffic signal within Tgl, without exceeding the maximum vehicle acceleration (amax) or the maximum allowable vehicle speed (Vdesired). In embodiments described herein, an initial feasibility of passing through a green light may be determined without reference to vehicle constraints such as VVIF and DVIF.

For example, if the subject vehicle is currently travelling at Vdesired (i.e., Vo=Vdesired), then determining if the subject vehicle can pass through the green light includes determining if Vdesired is sufficient velocity to cover the distance Dts1 within the time Tgl. If Vo<Vdesired, then determining if the subject vehicle can pass through the green light includes determining an acceleration, upper bound by amax, that will achieve a velocity (upper bound by Vdesired), and determining if the subject vehicle can pass through the green light by determining the distance covered during acceleration and constant velocity. If these distances can be achieved within Tgl and without exceeding amax or Vdesired, then it can be concluded that it is at least initially feasible to pass through the green light without stopping.

If it is not feasible to pass through the green light within Tgl, the AP determination circuitry 112 may determine a further initial feasibility of determining if the subject vehicle can arrive at the traffic signal when the traffic signal turns green on the next cycle and without stopping ("next cycle" means the next green light after the current green light). As discussed above, the cost/penalty of acceleration is generally higher than velocity, and therefore the largest cost/penalty is associated with acceleration from a complete stop. Therefore, determining if the subject vehicle can arrive at the traffic signal when the traffic signal turns green on the next cycle and without stopping may reduce the cost/penalty of acceleration. For this feasibility determination, the AP determination circuitry 112 is generally configured to determine if the time constraints of the traffic signal exceed the time horizon Th. For example, given the current value of Trgl and Trl, the AP determination circuitry 112 may determine a feasibility of arriving at the traffic signal when the traffic signal turns green on the next cycle (and without stopping) by determining if Th<Trgl+Trl. This indicates that the time horizon is insufficient to provide acceleration/deceleration values that would enable the subject vehicle to arrive at the traffic signal when the traffic signal turns green on the next cycle. If, given the constraint Th, it is not feasible to determine if the subject vehicle can arrive at the traffic signal when the traffic signal turns green on the next cycle without stopping, the AP determination circuitry 112 may determine a DP that would enable the vehicle to coast to a stop to the red traffic signal. In this regard, the initial feasibility described above may be determined at each time step k, and it may be the case that, at some later time step, one or both of the foregoing feasibility conditions are met.

Figure 4A:
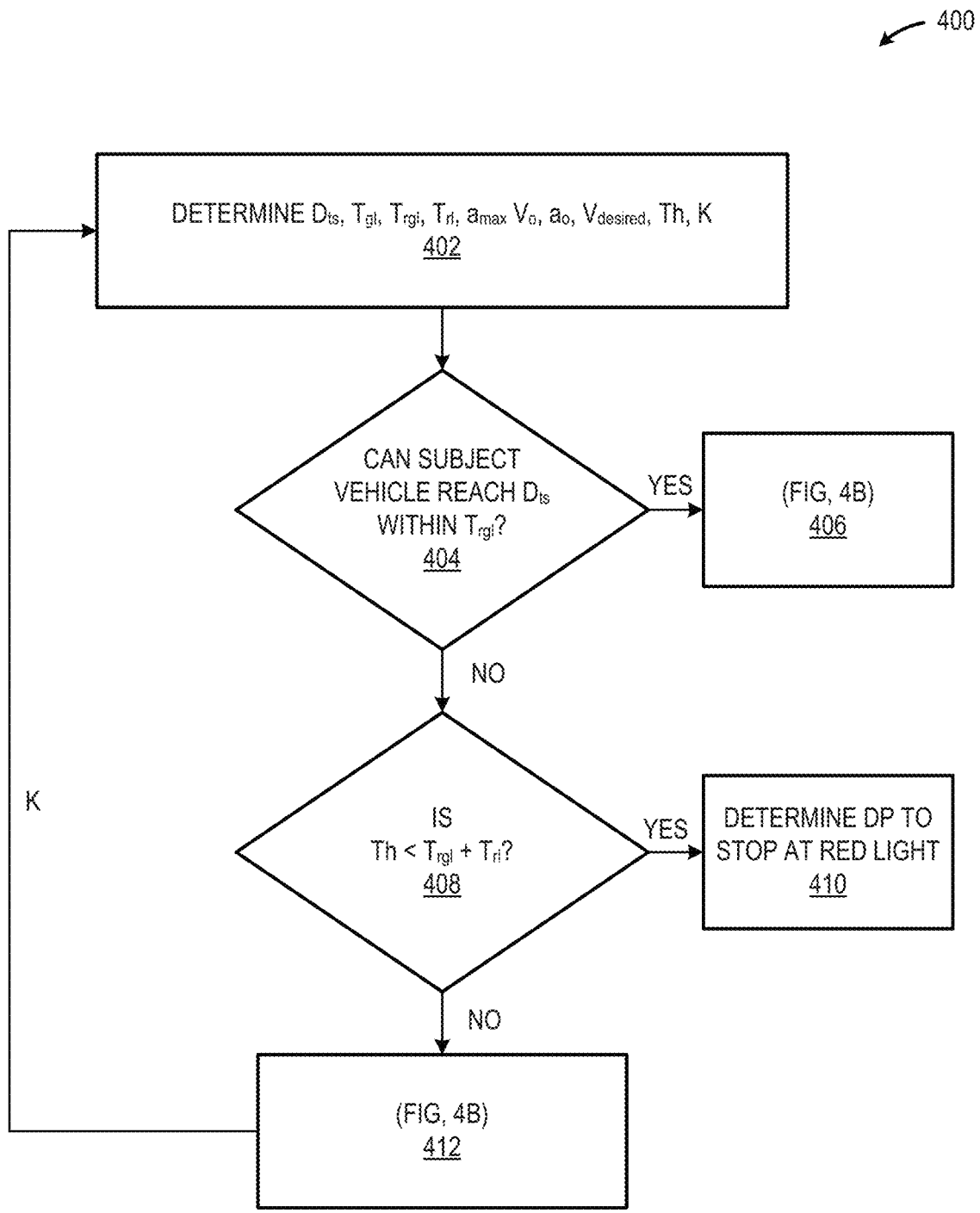
FIG. 4A illustrates a flowchart of operations to determine an initial feasibility of passing through a green traffic signal according to one embodiment of the present disclosure.

FIG. 4A illustrates a flowchart 400 of operations to determine initial feasibility conditions of passing through a green traffic signal according to one embodiment of the present disclosure. Operations according to this embodiment include determining Dts, Tgl, Trgl, Trl, Th, k, amax, Vdesired, Vo, and ao of the subject vehicle 402. Operations of this embodiment also include determining if the subject vehicle can reach Dts within Tgl, and without exceed amax or Vdesired 404. If the subject vehicle can reach the traffic signal given these constraints, at operation 406 additional constraints may be imposed to include vehicle constraints and/or additional system inputs, as described below and with reference to FIG. 4B.

If the subject vehicle cannot reach the traffic signal given these constraints, operations of this embodiment may also include determining if Th<Trgl 30 Trl, to determine if the subject vehicle can pass through the traffic signal at the next green light cycle 408. If Th<Trgl+Trl, indicating the time horizon is insufficient to determine an acceleration profile, operations of this embodiment also include determining a deceleration profile (DP) to enable the subject vehicle to stop at the red light 410. If Th>Trgl+Trl at operation 412, additional constraints may be imposed to include vehicle constraints and/or additional system inputs, as described below and with reference to FIG. 4B. Any or all of operations 402, 404, 406, 408, 410, and/or 412 may be repeated at each time step (k), to provide a continuously updating determination of the initial feasibility conditions.

Referring again to FIG. 1, in addition to determining if it is initially feasible to cross through the green traffic signal in the current green cycle (i.e., within Tgl), or the next green cycle (i.e., Th>Trgl+Trl), the AP determination circuitry 112 may determine at least one AP 120 based on vehicle constraints and system inputs to allow passing through the green light. In this regard, the AP determination circuitry, in some embodiments may simultaneously determine both traffic signal constraints and vehicle constraints when determining passing through a green light. In particular, the AP determination circuitry may determine at least one AP 120 that is based on the vehicle constraint profile (VCP) that includes VVIF and DVIF, the traffic signal constraint profile (TSCP), Tgl, Dts, amax, SDmin, Vo, ao, Vdesired, Th, and k, as described in greater detail below.

The velocity and position of vehicles ahead of the subject vehicle, and particularly, the VVIF and DVIF, may constrain determined acceleration values (and corresponding velocity values) in an AP. Thus, the AP determination circuitry may be configured to determine if VVIF is predicted to be sufficient velocity and/or if DVIF is a sufficient distance, over the time Tgl, to allow the subject vehicle to accelerate to a velocity (or accelerate to maintain a current velocity) and pass through the green light. For example, if VVIF values of a VCP are predicted to maintain a speed at or near Vdesired over the time Tgl, and if DVIF values of the VCP are predicted to be sufficient to maintain at least SDmin over the time Tgl, then the AP determination circuitry 112 may determine at least one AP 120 that includes acceleration values (and thus corresponding velocity values) for the subject vehicle to pass through the green light without stopping.

It should be noted that only a certain number of VVIF and DVIF values may be needed from the VCP, since it may be assumed here that Tgl is less than Th (and since the VCP includes predicted VVIF and DVIV values at each time step k, over Th). It should also be noted that Tgl may be less than Th, and may also have a time value that is not evenly divisible into Th. Thus, Tgl may not be a whole number multiple of k. In this case, AP determination circuitry 112 may round down the time Tgl1 to be a whole number multiple of k and determine the AP 120. This may reduce or eliminate the chances that the subject vehicle does not pass through the traffic signal before it changes from green to red (or from green to yellow). It should be further noted that it may not be necessary (or achievable) for the subject vehicle to reach the desired velocity, Vdesired, before crossing through the green signal, depending on, for example, Dts1 and Tgl1. As a general matter, and as noted above, the VVIF and/or DVIF may constrain the velocity of the subject vehicle. Thus, in some embodiments, the AP determination circuitry may set Vdesired to be VVIF, if VVIF<Vdesired. Thus, the determined at least one AP 120 may include acceleration values that do not achieve Vdesired within Tgl.

If the VVIF and/or DVIF values are predicted to be insufficient to enable the vehicle to pass through the green light within Tgl, the AP determination circuitry 112 may determine a DP 122 to enable the subject vehicle to a stop at the red traffic signal, while minimizing disruption of vehicles behind the subject vehicle. For example, the predicted values for VVIF may be too slow to enable the subject vehicle to achieve a velocity that enables passing through the green light. As another example, the predicted values of DVIF may be at or near SDmin, over Tgl, which may leave the subject vehicle with little or no opportunity to accelerate to a sufficient velocity to pass through the green light.

Figure 4B:
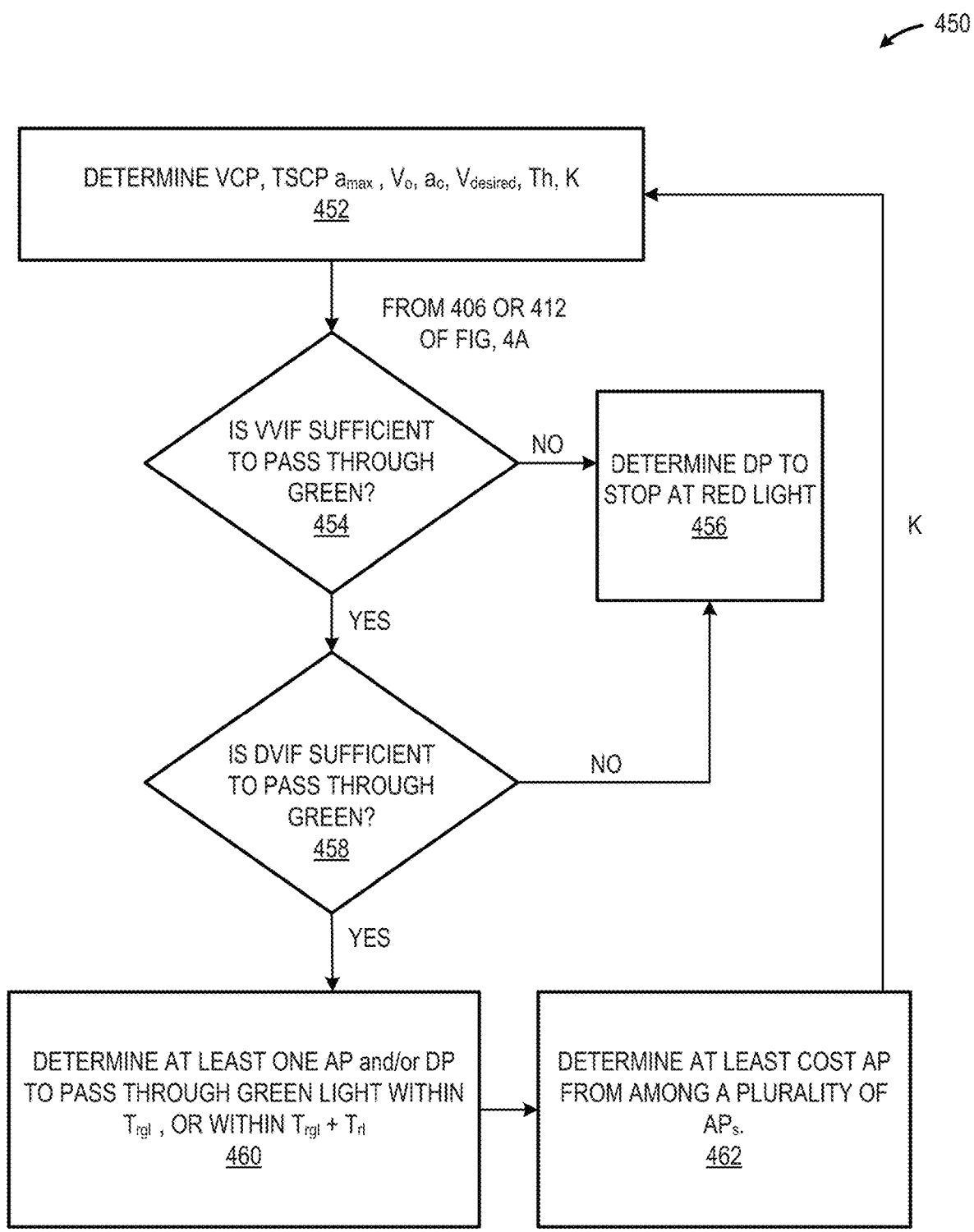
FIG. 4B illustrates a flowchart of operations to determine at least one acceleration profile (AP) to enable the subject vehicle to pass through a green traffic signal according to one embodiment of the present disclosure.

FIG. 4B illustrates a flowchart 450 of operations to determine at least one acceleration profile (AP) to enable the subject vehicle to pass through a green traffic signal. Operations according to this embodiment include determining VCP, TSCP, Th, k, amax, Vdesired, Vo, and ao of the subject vehicle 452. Operations of this embodiment also include determining if VVIF is sufficient to allow the subject vehicle to pass through the green light within Tgl, while maintaining SDmin between the subject vehicle and the VIF 454. If VVIF is insufficient to allow the subject vehicle to pass through the green light within Tgl, operations of this embodiment may also include determining a DP to enable the subject vehicle to a stop at the red traffic signal 456, while minimizing disruption of vehicles behind the subject vehicle 456. If VVIF is sufficient to allow the subject vehicle to pass through the green light within Tgl, operations may also include determining if DVIF is sufficient to allow the subject vehicle to pass through the green light within Tgl 458. If DVIF is insufficient to allow the subject vehicle to pass through the green light within Tgl1, operations of this embodiment may also include determining a DP to enable the subject vehicle to a stop at the red traffic signal 456, while minimizing disruption of vehicles behind the subject vehicle. If DVIF is sufficient to allow the subject vehicle to pass through the green light within Tgl, operations of this embodiment also include determining at least one AP to enable the subject vehicle to pass through the green light within Tgl 408. A determined AP may include acceleration values that are bound by amax, and corresponding velocity values bound by Vdesired. Operations of this embodiment may also include determining a least cost AP, from among a plurality of determined APs 442. The operations of this embodiment may be repeated, in whole or in part, for each time step k.

If passing through the green light is deemed infeasible, the AP determination circuitry 112 may determine an efficient DP to enable stopping at the red light. Such determination may include, for example, using the red light weighting factor wrl to apply acceleration and/or coasting and braking to cause the vehicle to stop at the red light in a least cost manner.

Of course, the operations described above may be extended to include multiple traffic signal within Dh, and within Th. In this regard, the TSCP may include the traffic signal constraints for each traffic signal, and the AP determination circuitry 112 may determine that two or more traffic signals may change states over Th. This may require the subject vehicle to have a combination (over Th) of acceleration and deceleration to avoid stopping at a traffic signal. Accordingly, the AP determination circuitry 112 may be configured to determine an initial feasibility of passing through multiple traffic signals, based on DtsN, TglN, TrglN, TrlN, and/or TrrlN. For example, if a first traffic signal within Th is in a green state, and a second traffic signal is in a red state, the AP determination circuitry 112 may determine feasibility of passing through the first green signal without stopping (as described above), and a feasibility of arriving at the second traffic signal as it changes from red to green (in a current cycle and/or a next cycle). It may be the case that it is only feasible to pass through the first green light, but the vehicle must stop at the next red light. Once an initial feasibility of passing through multiple traffic signals is determined, the AP determination circuitry 112 may incorporate vehicle constraints and other system inputs to determine at least one AP and/or at least one DP, over Th, that provides the subject vehicle the corresponding velocity to pass through each signal without stopping.

Determining Acceleration/Deceleration Profiles On a Multiple Lane Roadway

The foregoing description of determining acceleration/deceleration profiles based on vehicle constraints, traffic signal constraints and system input has assumed that the subject vehicle is travelling on a single lane road, or that steering control may be otherwise unavailable for the subject vehicle. However, as may be appreciated, changing lanes may enable the subject vehicle to achieve efficiency parameters such as passing through a green light or achieving a desired velocity that may otherwise be unachievable absent changing lanes.

Accordingly, in some embodiments, the AP determination circuitry 112 may also include lane change determination circuitry 114 to determine availability for the subject vehicle to change lanes to achieve an efficiency parameter. In this regard, the following description assumes that the subject vehicle is travelling along a roadway with least two travelling lanes (L). To determine vehicle constraints that may be present for each lane, in this embodiment the vehicle constraint determination circuitry 108 may be configured to determine a number of lanes (L), and a VCP for each lane that includes respective predictive values for VVIF and DVIF in each lane.

The lane change determination circuitry 114 may determine an initial feasibility passing through a green light without stopping, similar to the description above and with reference to FIG. 4A. If it is not feasible, the subject vehicle may stay in the current lane and stop at the red light. If it is feasible, the lane change determination circuitry 114 may incorporate the vehicle constraints in each lane to determine at least one AP and/or DP 120/122 and to determine a lane change profile 124 to enable the subject vehicle to change lanes and pass through the traffic signal without stopping.

The lane change determination circuitry 114 may determine if a VVIF of adjacent lane(s) is sufficient to pass through the green light. If VVIF in adjacent lane(s) is insufficient, the lane change determination circuitry 114 may determine a DP to stop at the red light without changing lanes. If VVIF in at least one adjacent lane is sufficient to pass through the green traffic signal, the lane change determination circuitry 114 may determine if any vehicles are present in a target adjacent lane, which would prevent changing into that one. For example, there may be a vehicle next to, or slightly ahead of (and within SDmin) of the subject vehicle (as may be determined using one or more vehicle sensors 104). The lane change determination circuitry 114 is configured to prevent lane changing into the target lane under those circumstances. As another example, a vehicle travelling in the target lane may be behind the subject vehicle, but travelling at a rate that would prevent the subject vehicle from changing into the target lane. It should be noted that some state laws do not permit lane changing to occur in an intersection. Accordingly, the lane change determination circuitry 114 may determine if the minimum distance to change lanes (LCmin) is less than Dts. This may enable avoiding a lane change operation within an intersection. If the "coast is clear" in the target lane and LCmin<Dts, the lane change determination circuitry 114 may determine at least one AP/DP 120/122 to pass through the green signal, as described above, and also determine a lane change profile to change lanes into an adjacent lane. It should be noted that lane change determination circuitry 114 may operate at each step k.

Figure 5:
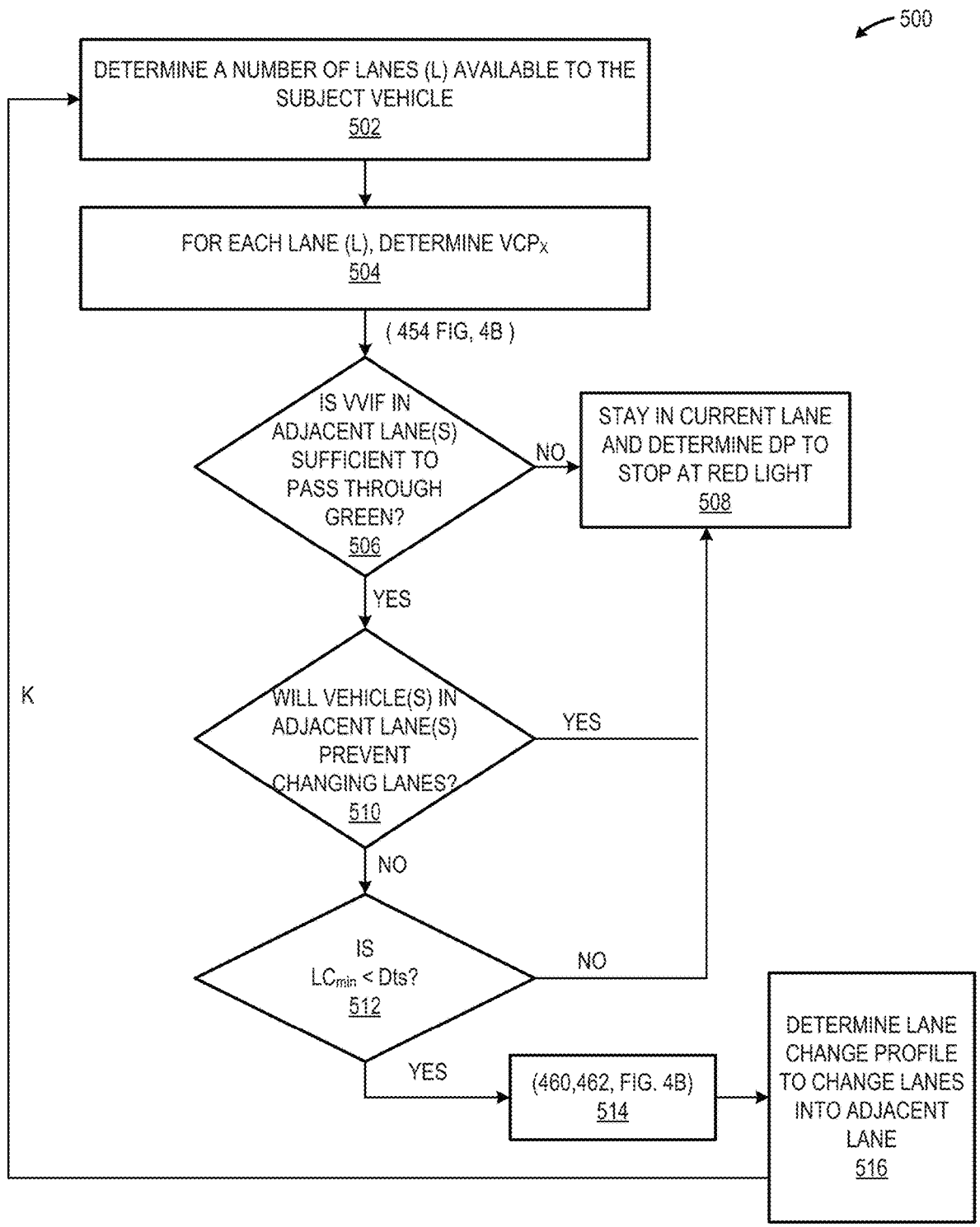
FIG. 5 illustrates a flowchart of lane change operations according to one embodiment of the present disclosure.

FIG. 5 illustrates a flowchart 500 of lane change operations according to an embodiment of the present disclosure. Operations of this embodiment include determining a number of lanes (L) available to the subject vehicle 502. Operations of this embodiment also include determining a VCP profile for each lane (L), over Th and for each time step k 504. Operations of this embodiment also include determining if VVIF in one or more adjacent lane(s) is sufficient to enable the subject vehicle to pass through a green light 506. If unable to pass through a green light, operations of this embodiment may also include determining a DP to enable the subject vehicle to stop at a red light without changing lanes 508. If changing lanes would enable the subject vehicle to pass through the green light (506), operations of this embodiment also include determining if one or more vehicles (or other objects) are present in a target lane that would prevent changing into the target lane 510. This may include, for example, vehicles in the target lane that are next to or behind the subject vehicle. If vehicles in a target lane(s) prevent changing into that lane, operations of this embodiment may also include determining a DP to enable the subject vehicle to stop at a red light without changing lanes 508. If there are no vehicles in the target lane that would prevent a lane change into the target lane, operations of this embodiment also include determining if a minimum lane change distance (LCmin) is less than the distance to the traffic signal (Dts) 512. This operation may prevent, for example, lane changing to occur while in an intersection. If VLmin>Dts, operations of this embodiment may also include determining a DP to enable the subject vehicle to stop at a red light without changing lanes 508. If LCmin<Dts, operations of this embodiment also include determining at least one AP to pass through the green light within Trgl or within Trgl+Trl 514 (as described above with reference to operation 460 of FIG. 4B). Operations of this embodiment also include determining a lane change profile to change lanes into an adjacent lane 516. The operations of this embodiment may be repeated, in whole or in part, for each time step k.

The AP 120, DP 122 and/or lane change profile 124, as described in the embodiments above, may be utilized for powertrain, braking and steering control, respectively. For example, if the subject vehicle is a fully autonomous (e.g., Level 5) vehicle, the vehicle control system 100 of FIG. 1 may also include interface circuitry (not shown) to interface with the AP 120, DP 122 and/or lane change profile 124 to generate powertrain control signals, braking control signals and/or steering control signals to control the powertrain, braking system and/or steering stem according to the acceleration, deceleration and/or lane change profiles. As another example, if the subject vehicle is non-autonomous (e.g., Level 1) and/or semi-autonomous (e.g., Levels 2-4), the AP 120, DP 122 and/or lane change profile 124 may be used to generate visual and/or audible and/or tactile indications to prompt a driver to execute acceleration, deceleration and/or lane changing according to the profiles.

In any of the embodiments described herein, the sensor circuitry 104, at any point, may generate one or more override signals, for example, indicating the presence of an object, vehicle or person in the roadway. These override signals may trigger the vehicle controller circuitry 106 to terminate any AP/DP and or steering profile determination, described above, and enable the subject vehicle to immediately address the situation that resulted in an override signal. This may include, for example, emergency braking and/or steering to avoid a collision.

While FIGS. 2-5 illustrate various operations according to one or more embodiments, it is to be understood that not all of the operations depicted in FIGS. 2-5 are necessary for other embodiments. Indeed, it is fully contemplated herein that in other embodiments of the present disclosure, the operations depicted in FIG. 2-5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Background Of Discrete-Time Analysis

As described above, in some embodiments of the present disclosure, an AP and corresponding acceleration values may be determined using discrete time techniques. By way of background, in the time domain, acceleration and cost/penalty may be generally described as a point mass in longitudinal motion:

$\dot{v}=a, \dot{s}=v$ where v and s respectively denote the speed and position of the vehicle and the acceleration a is the decision variable. The customary over-dot indicates derivative with respect to time. Assume that the initial speed $v_0$ is given and we are to choose acceleration a to achieve the given target speed $v^*(t)$. An optimal control problem may be represented as a quadratic cost function:

$$\mathcal{L} = \frac{1}{2}(v - v^*)^2$$

$$J = \int_{t_0}^{t_f} \mathcal{L} dt$$

$$a^* = \underset{a}{\operatorname{argmin}} J$$

subject to $\dot{v} = a, \dot{s} = v, a_{min} \leq a \leq a_{max}$

Note that this cost function is chosen to minimize the speed error but otherwise it does not consider the "gentleness" of energy transactions between the powertrain and the vehicle. That gentleness may arise from regularization of optimal control solutions.

The analysis may begin by forming a Hamiltonian equation and defining the dynamics of the co-states λ. Note that $\lambda_1$ has units of distance and $\lambda_2$ those of speed.

$$\mathcal{H} = \frac{1}{2}(v - v^*)^2 + \lambda_1 a + \lambda_2 v$$

$$\dot{\lambda}_1 = -\frac{\partial \mathcal{H}}{\partial v} = -(v - v^* + \lambda_2)$$

$$\dot{\lambda}_2 = -\frac{\partial \mathcal{H}}{\partial s} = 0$$

Note that $\lambda_2$ remains constant through the trajectory and the evolution of $\lambda_1$ can be written in the integral form below. Note that $\lambda_1$ in a sense captures the difference between the actual distance traveled and distance that would be traveled at the target speed.

$$\lambda_1(t) - \lambda_1(t_0) = -\lambda_2(t - t_0) - \int_{t_0}^{t}(v - v^*) d\tau$$

The analysis may next apply Pontryagin principle to obtain the control law to minimize the cost function J. Note that the Pontryagin principle essentially makes the optimal control problem into a (nonlinear) optimization problem—by selecting acceleration a that minimizes H for the given states (s,v) and co-states ($\lambda_1, \lambda_2$). Since H in this case is linear in a, this yields a bang-bang control law:

$$a^* = \underset{a}{\operatorname{argmin}} \frac{1}{2}(v - v^*)^2 + \lambda_1 a + \lambda_2 v$$

$$a^* = \begin{cases} a_{min} & \text{if } \lambda_1 > 0 \\ a_{max} & \text{if } \lambda_1 < 0 \end{cases}$$

Simply stated, the control law chooses the maximum allowed acceleration if we have not covered the distance expected at the target speed; it chooses the maximum allowed deceleration if we have covered extra distance.

The bang-bang control law is unlikely to be acceptable for passenger transport. As pointed out earlier, this discontinuous control law results from the linear dependence of H on the decision variable a. Accordingly, in at least one embodiment herein, the original problem may be regularized by penalizing the $a_{min} \leftrightarrows a_{max}$ switching action by adding a quadratic term in the decision variable to the Lagrangian:

$$\mathcal{L} = \frac{1}{2}(v - v^*)^2 + w\frac{1}{2}a^2$$

The problem otherwise stays the same—stay as close to the target speed but avoid high-magnitude acceleration. The solution resulting from application of Pontryagin principle is smooth—the smoothness depends on the magnitude of the so-called regularization parameter w>0. An exemplary scheme to determine w after the problem is discretized is described below.

The Pontryagin principle has great theoretical significance and it often provides insights into the nature of the optimal solution. However, figuring out the terminal conditions of the co-states and solving the state/co-state ordinary differential equations with mixed initial-final conditions is generally quite challenging.

For practical application, the present disclosure may convert the continuous-time optimal control problem to a discrete-time equivalent and solving it with conventional and/or proprietary optimization techniques.

Recall that the regularized problem has a weighted quadratic term in the decision variables; the weighting factor w is yet to be decided. Before proceeding, an additional modification may be made to the problem by introducing a first-order filter with time-constant T, between the new decision variable q and the acceleration a. That is, acceleration a is no longer directly chosen, but rather acceleration a is chosen indirectly via q. This is consistent with the acceleration/deceleration that is applied to the subject vehicle, meaning that acceleration/deceleration is not an instantaneous response, and is also consistent with the way a driver presses/releases the accelerator and brake pedals. The dynamics of the point-mass system becomes:

$$\begin{pmatrix} \dot{a} \\ \dot{v} \\ \dot{s} \end{pmatrix} = \underbrace{\begin{pmatrix} -1/T & 0 & 0 \\ 1 & 0 & 0 \\ 0 & 1 & 0 \end{pmatrix}}_{A_c} \underbrace{\begin{pmatrix} a \\ v \\ s \end{pmatrix}}_{x_c} + \underbrace{\begin{pmatrix} 1/T \\ 0 \\ 0 \end{pmatrix}}_{B_c} (q)_{u_c}$$

Where $t_s$ is the time-step used to convert the continuous-time system to discrete-time. Then the discrete time matrices (A,B) are obtained from the continuous-time matrices ($A_c$, $B_c$) as below:

$$A = e^{A_c t_s}$$

$$B = \int_0^{t_s} e^{A_c t} dt B_c = A_c^{-1}(A - 1) B_c,$$

Note that the discrete-time system (A, B) matches exactly with the continuous-time system ($A_c$, $B_c$) at the sample times $n\, t_s$, $n \in 0, 1, \ldots$; i.e., there is no truncation error and no issue of numerical stability of solution. A numerical trick may be employed to obtain the discrete-time (A,B):

$$\begin{pmatrix} A & B \\ 0 & I \end{pmatrix} = e^{\begin{pmatrix} A_c & B_c \\ 0 & 0 \end{pmatrix} t_s}.$$

As the names implies, model predictive control uses a system model to calculate the state trajectory for a given input sequence and chooses a sequence that minimizes the cost function (subject to applicable constraints). Let $t_h$ denote the time-horizon over which the model predictive control plans the input sequence. Then, $N = \lceil t_h/t_s \rceil$ denotes the number of steps to be planned. We note:

$$x_{n+1} = Ax_n + Bu_n$$

$$x_{n+2} = Ax_{n+1} + Bu_{n+1} = A^2 x_n + ABu_n + Bu_{n+1}$$

$$\vdots$$

$$x_{n+N} = Ax_{n+N-1} + Bu_{n+N-1} = A^N x_n + \sum_{k=0}^{N-1} A^{N-1-k} Bu_{n+k}$$

Note that the state $x_k$ at step k is a 3×1 vector with rows respectively being the acceleration $a_k$, speed $v_k$, and distance $s_k$. We can now assemble a representation of the entire trajectory of acceleration, speed, and distance:

$$\underbrace{\begin{pmatrix} a_{n+1} \\ \vdots \\ a_{n+k} \\ \vdots \\ a_{n+N} \end{pmatrix}}_{\bar{a}} = \underbrace{\begin{pmatrix} [A^1](1,:) \\ \vdots \\ [A^k](1,:) \\ \vdots \\ [A^N](1,:) \end{pmatrix}}_{c\_a\_x_0} x_n + \underbrace{\begin{pmatrix} [B](1,:) & & \\ \vdots & & \\ [A^{k-1}B](1,:) & \ldots & [B](1,:) \\ \vdots & & \\ [A^{N-1}B](1,:) & \ldots & \ldots & [B](1,:) \end{pmatrix}}_{c\_a\_u} \underbrace{\begin{pmatrix} u_n \\ u_{n+1} \\ \vdots \\ u_{n+N-1} \end{pmatrix}}_{\bar{u}}$$

$$\underbrace{\begin{pmatrix} v_{n+1} \\ \vdots \\ v_{n+k} \\ \vdots \\ v_{n+N} \end{pmatrix}}_{\bar{v}} = \underbrace{\begin{pmatrix} [A^1](2,:) \\ \vdots \\ [A^k](2,:) \\ \vdots \\ [A^N](2,:) \end{pmatrix}}_{c\_v\_x_0} x_n + \underbrace{\begin{pmatrix} [B](2,:) & & \\ \vdots & & \\ [A^{k-1}B](2,:) & \ldots & [B](2,:) \\ \vdots & & \\ [A^{N-1}B](2,:) & \ldots & \ldots & [B](2,:) \end{pmatrix}}_{c\_v\_u} \underbrace{\begin{pmatrix} u_n \\ u_{n+1} \\ \vdots \\ u_{n+N-1} \end{pmatrix}}_{\bar{u}}$$

$$\underbrace{\begin{pmatrix} s_{n+1} \\ \vdots \\ s_{n+k} \\ \vdots \\ s_{n+N} \end{pmatrix}}_{\bar{s}} = \underbrace{\begin{pmatrix} [A^1](3,:) \\ \vdots \\ [A^k](3,:) \\ \vdots \\ [A^N](3,:) \end{pmatrix}}_{c\_s\_x_0} x_n + \underbrace{\begin{pmatrix} [B](3,:) & & \\ \vdots & & \\ [A^{k-1}B](3,:) & \ldots & [B](3,:) \\ \vdots & & \\ [A^{N-1}B](3,:) & \ldots & \ldots & [B](3,:) \end{pmatrix}}_{c\_s\_u} \underbrace{\begin{pmatrix} u_n \\ u_{n+1} \\ \vdots \\ u_{n+N-1} \end{pmatrix}}_{\bar{u}}$$

In summary, the state trajectory $(\bar{a}, \bar{v}, \bar{s})$ over the planning time-horizon $t_h$ can be described as below:

$$\bar{a} = c\_a\_x_0 x_n + c\_a\_u \bar{u},$$

$$\bar{v} = c\_v\_x_0 x_n + c\_v\_u \bar{u},$$

$$\bar{s} = c\_s\_x_0 x_n + c\_s\_u \bar{u},$$

$\bar{u}$ is a N×1 vectors of decision variables; $x_n$ is a 3×1 vector of initial conditions; $\bar{a}, \bar{v}, \bar{s}$ are N×1 vectors of state trajectories over the planning horizon; c_a_x_0, c_v_x_0, c_s_x_0 are N×3 matrices; and c_a_u, c_v_u, c_s_u are N×N matrices.

Note that the coefficient matrices c_a_u, c_v_u, and c_s_u are assembled from the incremental controllability matrices for system (A, B). These matrices determine how the input sequence $\bar{u}$, the decision variable of the model predictive control, affects the state trajectory. Note that the numerical condition number of c_s_u is worse than that of c_v_u which in turn is worse than that of c_a_u. This may become a consideration in the numerical solution of the optimization problem.

The cost function, without regularization, for the discrete-time system over the N-step planning horizon can be represented from that of the continuous-time system as:

$$J_n = \sum_{k=1}^{N} \frac{1}{2}(v_{n+k} - v_{n+k}^*)^2$$

$$= \frac{1}{2}(\bar{v} - \bar{v}^*)^T (\bar{v} - \bar{v}^*)$$

$$\frac{1}{2}(c\_v\_x_0 x_n + c\_v\_u\bar{u} - \bar{v}^*)^T (c\_v\_x_0 x_n + c\_v\_u\bar{u} - \bar{v}^*)$$

$$= \frac{1}{2}\bar{u}^T \underbrace{c\_v\_u^T c\_v\_u}_{H} \bar{u} + \underbrace{(c\_v\_x_0 x_n - \bar{v}^*)^T c\_v\_u}_{f^T} \bar{u} +$$

$$\frac{1}{2}\underbrace{(c\_v\_x_0 x_n - \bar{v}^*)^T (c\_v\_x0x_n - \bar{v}^*)}_{c}$$

$$= \frac{1}{2}\bar{u}^T H \bar{u} + f^T \bar{u} + c$$

Note that the term c is independent of the decision variables $\bar{u}$ and hence an inconsequential constant as far as optimization. Matrix H of the quadratic term is constant once the time step $t_s$ and the planning horizon $t_h$ are fixed. Vector f of the linear term varies with time as the initial conditions $x_n$ and the target speed $\bar{v}^*$ change over the ensuing planning horizon.

As shown in the discrete cost equation above, the coefficient matrix H of the un-regularized quadratic term is H=c_v_u$^T$c_v_u. The unconstrained solution $\bar{u}^*$ that minimizes cost $\frac{1}{2}\bar{u}^T H\bar{u}+f^T\bar{u}$ is $\bar{u}^*=-H^{-1}f$. H is symmetric and hence has orthogonal eigenvectors as long as the eigenvalues are distinct. Thus, we can gain insight into the nature of the unconstrained solution $\bar{u}^*$ by looking at the eigensystem of H.

Figure 6:
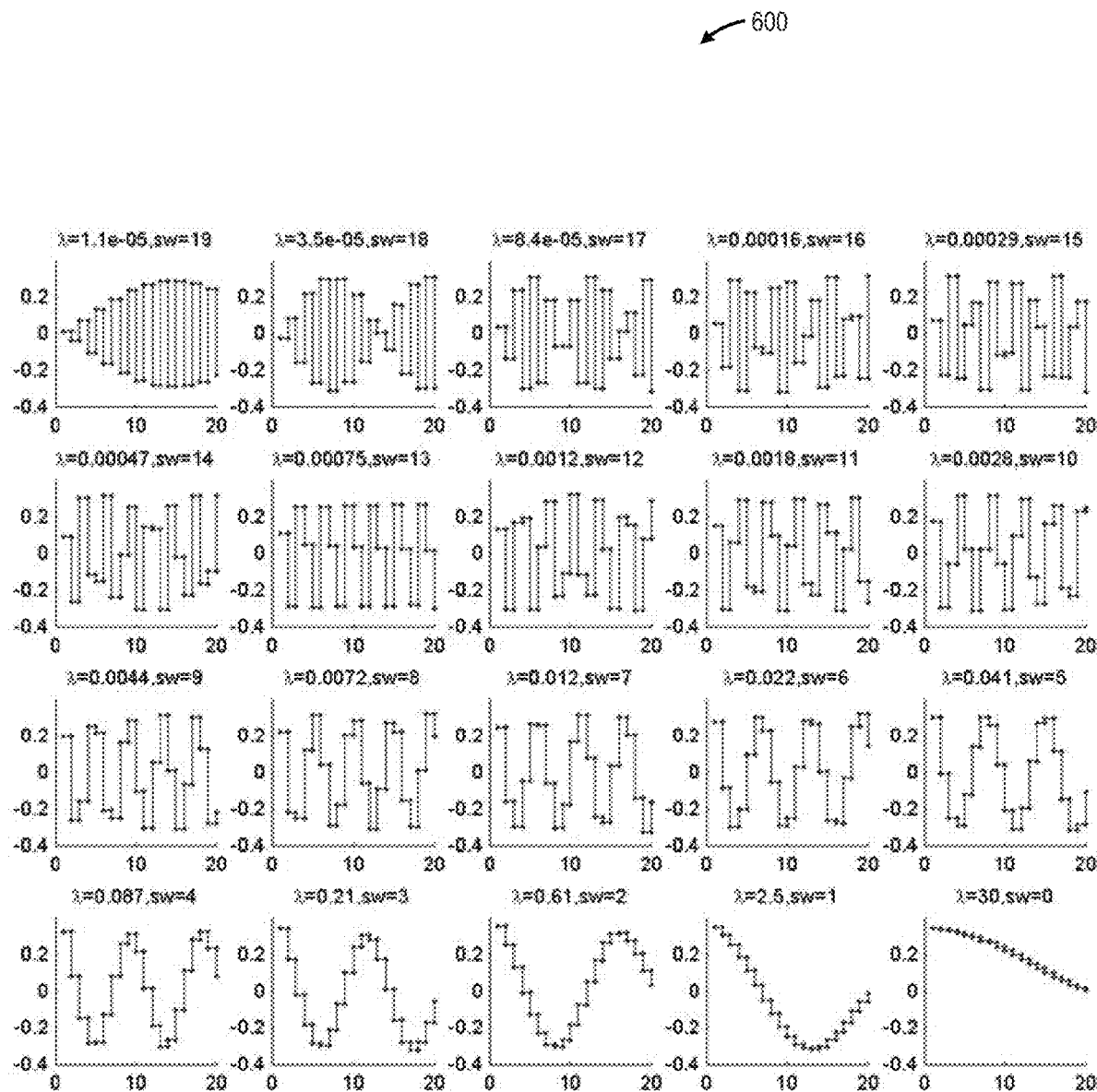
FIG. 6 illustrates example plots of discrete time acceleration values using various weighting factor values.

FIG. 6 illustrates example plots 600 of discrete time acceleration values using various weighting factor values. As an example, we consider the discrete-time representation of our problem at time step $t_s$=0.5 [s] and planning horizon $t_h$=10 [s]. The system matrices (A, B) are:

$$A = \begin{pmatrix} 0.71653 & 0 & 0 \\ 0.4252 & 1 & 0 \\ 0.1122 & 0.5 & 1 \end{pmatrix} \quad B = \begin{pmatrix} 0.28347 \\ 0.074797 \\ 0.012805 \end{pmatrix}$$

Note that our planning horizon has N=⌈$t_h/t_s$⌉=20 steps and the H matrix is 20×20. Each of the plots of FIG. 6 illustrate plots of the eigenvectors of H. Recognize that the eigenvectors of H form a basis for $\bar{u} \in \mathcal{R}^{20 \times 1}$, the real vector space from which the decision variable $\bar{u}$ is chosen. Printed at the top of each plot is the eigenvalue and the number of sign changes in the corresponding eigenvector. For example, the plot at the top left corresponds to the smallest eigenvalue of $1.1e^{-5}$ and the eigenvector has 19 sign changes. On the other hand, the plot at the lower right corresponds to the highest eigenvalue of 30 and the eigenvector has no sign changes. This implies monotonic approach to the target speed, without under or overshoot, if one were to choose that eigenvector as the decision $\bar{u}^*$. This insight is useful if a smooth speed profile is a consideration, for example, in passenger vehicle applications.

This observation provides another insight into the bang-bang nature of the optimal control law—the cost is reduced if one chooses a solution that looks like the eigenvectors associated with the small eigenvalues and these eigenvectors all have several sign changes. This provides the following guidance for regularization: choose weight w so that the eigenvalues of the regularized quadratic coefficient H+w $I_{20 \times 20}$ are large enough. If we desire smooth acceleration, a weighting factor equal to the largest eigenvalue $\lambda=30$ makes sense. We could accept a more abrupt deceleration, for example, to avoid collision with a vehicle cutting-in. In that case we could choose w equal to the second (or third) largest eigenvalue $\lambda=2.5$. As described above, different weight factors for the acceleration, wgl, (or the "green problem") compared to that for deceleration, wrl (or the "red problem") may be used.

As described above, and in one embodiment, a car following model may be used in determining vehicle constraints. Formulation of model-predictive control for the subject vehicle requires a reasonable prediction of the speed (and location) of the vehicle(s) ahead over the planning horizon. Since no explicit information on the future motion of the lead vehicles is available, the car following model may be used to consider the cascade effect resulting from slow-down of the lead vehicles. To that end, in some embodiments the car following model may use conventional techniques such as the Gipps model, the intelligent driver model, Newell model, etc.

In the Gipps car following model, a vehicle in traffic is considered constrained by the vehicle in front; no constraint other than the published road speed-limit applies if no lead vehicle exists. If constrained by a lead vehicle, the follower adjusts its speed to arrange enough/safe headway to the vehicle in front (e.g., SDmin). A headway is considered safe if the follower can act and reasonably avoid colliding with the leader.

For the treatment below, we revert back to continuous time. We denote the extreme acceleration, extreme deceleration (braking), speed, target speed, and distance/location of vehicle n at time t by $a^n \geq 0$, $b^n < 0$, $v^n \geq 0$, $s^n \geq 0$, $v^{n*} \geq 0$. $L^n$ denotes length of vehicle n. Note that the vehicles are numbered starting farthest from the ego.

Gipps imposes constraints on the speed of vehicle n at the end of the apparent reaction time $\tau$; he also allows for an additional delay $\theta$ (nominally equal to $\tau/2$). Gipps requires that the speed of vehicle n be less than the smaller of the two values—one resulting from the driver's desire to smoothly achieve the target speed:

$$v^n(t+\tau) \leq v^n(t) + 2.5a^n\tau(1-v^n(t)/v^{n*}(t))\sqrt{0.025+v^n(t)/v^{n*}(t)},$$

and the other resulting from the deceleration that must be arranged as a reaction to the potential slow-down of the lead vehicle; $\bar{s}$ in the below represents the potential (not necessarily actual) stopping distance/location:

$$\bar{s}^{n-1}(t+\tau) = s^{n-1}(t) - (v^{n-1})^2/(2b^{n-1})$$

$$\bar{s}^n(t+\tau) = s^n(t) + (v^n(t)+v^n(t+\tau))\tau/2 - v^n(t+\tau)^2/(2b^n).$$

For safety, the difference between the point where vehicle n−1 could potentially stop and where vehicle n stops must be greater than the effective length $L_{n-1 \text{ of vehicle } n}-1$. Gipps assumes that the driver of vehicle n incorporates additional buffer time $\theta$ while traveling at $v(t+\tau)$. Thus, the revised stopping criterion becomes:

$$s^{n-1}(t) - v^{n-1}(t)^2/(2b^{n-1}) - L^{n-1}$$

$$\geq s^n(t) + (v^n(t)+v^n(t+\tau))\tau/2 - v^n(t+\tau)^2/(2b^n) + v^n(t+\tau)\theta.$$

Note that $b^{n-1}$ and $b^n$ denote the actual deceleration of the respective vehicle; we misuse the notation and allow it to represent the largest possible estimate of the same. Solve for $v^n(t+\tau)$:

$$v^n(t+\tau) \leq$$
$$b^n\tau + \sqrt{(b^n)^2\tau^2 - b^n\left(2(s^{n-1}(t) - L^{n-1} - s^n(t)) - v^n(t)\tau - v^{n-1}(t)^2/b^{n-1}\right)}$$

Taking the minimum of the two constraints on speed (one from target speed and the other from extreme braking), we obtain:

$$v^n(t+\tau) \leq \min\Big\{v^n(t) + 2.5a^n\tau(1-v^n/v^{n*})\sqrt{0.025+v^n(t)/v^{n*}},$$
$$b^n\tau + \sqrt{(b^n)^2\tau^2 - b^n\left(2(s^{n-1}(t) - L^{n-1} - s^n(t)) - v^n(t)\tau - v^{n-1}(t)^2/b^{n-1}\right)}\Big\}$$

Some may deem the Gipps model to be predicting the worst-case congestion situation; this can be improved by incorporating any advance plan information over $t_h$ if provided by the lead vehicles. As an alternative, a simplistic approach could assume that all lead vehicles to continue at their respective current speed, over the planning horizon, instead of being subject to the Gipps model.

The Gipps formulation presented in the foregoing is in continuous-time; however, embodiments of the present disclosure may employ its discrete-time counterpart. To do so in the simplest manner, it may be assumed that the driver reaction time $\tau$ equals the discrete step-size $t_s$ and the additional buffer time $\theta=0$. If $\tau \neq t_s$ and/or $\theta \neq 0$, then interpolation of the speed profile at the $t_k \in \{t_s, 2t_s, \ldots, Nt_s\}$ may be determined over the planning horizon $t_h$. In one embodiment, $\tau = t_s = 0.5$ [s] and $\theta = 0$ [s] and interpolation is not used.

In the model-predictive planning of the speed of the subject vehicle, the Gipps model may be used for two purposes:

1. To predict the speed of lead vehicles over the planning horizon. For this the analysis starts with the farthest vehicle within Dh and it is assumed that the farthest vehicle maintains its current speed over the planning horizon $t_h$. The cascade effect from potential slow-down of the other lead vehicles may be recursively determined.

2. To construct constraints on the subject vehicle speed resulting from the nearest lead vehicle. The prediction of the speed profile of the nearest lead vehicle embodies the projected speed profiles of all other lead vehicles.

The notion of maintaining "minimum distance" to the nearest lead vehicle as a function of the absolute and relative speed of the subject vehicle is intuitively appealing. However, a vehicle cutting in ahead of the subject vehicle could render the problem infeasible even though the problem were feasible just prior to the cut-in. Consequently, the present disclosure may incorporate this "safety" constraint in an inverse manner—the maximum speed of the subject vehicle as a function of the distance to the nearest lead vehicle. Constraining the subject vehicle speed in this manner may require high deceleration to avoid collision—a reasonable representation of the reality. However, to maintain feasibility of the problem, the box constraints on the decision variables may be expanded from a relatively small number (e.g., ±4 m/s$^2$) to somewhat a relatively large number (e.g., ±10 m/s$^2$). Since high magnitudes of acceleration q are penalized, as described herein, the determinations of the present disclosure may choose extreme deceleration only if necessary to avoid a collision.

Let $v_k$ and $v_k^l$ respectively denote the speed of the subject vehicle and that of the nearest lead vehicle. Further, let $s_k$ and $s_k^l$ respectively denote the location of the subject vehicle and that of the nearest lead vehicle. As described in the foregoing, a (nonlinear) state constraint may be imposed of the form:

$$v_{k+n} \leq g(s_{k+n-1}^l - s_{k+n-1}, v_{k+n-1}^l, v_{k+n-1}), n \in 1, \ldots, N.$$

Note that $v_{k+n}$ depends on the (yet unknown) decision variables. (It should be noted that the time-horizon is indexed by subscript (such as k) while the vehicles are indexed by the superscript (such as n), which is not the same n described above as part of subscript k+n. The constraint may be formulated in terms of the decision variables. To that end, the right-hand side of this equation may be linearized around a known solution, i.e., the location of the subject vehicle subject only to the box constraints on the decision variables; i.e., without the lead vehicle and traffic signal constraint. Following along with this analysis, two decisions may be made for optimization: first to obtain a box-constrained point $\overline{u}^{bc}$ to linearize the above equation, and second to solve the quadratic program with the resulting general linear inequality constraints. The second step may include solving the problem twice—once for the "green problem" failing which for the "red problem". This approach allows for the computation of the formulation as a real-time quadratic program. This box-constrained speed and location of the subject vehicle is denoted by $v_k^{bc}$ and $s_k^{bc}$. The linearization of this equation proceeds as described below; note that Dg denotes the derivative of g with respect to its argument, and the vector inequality and product apply element-wise:

$$\overline{v} \leq g(\overline{s}^l - \overline{s})$$
$$= g(\overline{s}^l - \overline{s}^{bc} + \overline{s}^{bc} - \overline{s})$$
$$= g(\overline{s}^l - \overline{s}^{bc}) + Dg|_{(\overline{s}^l - \overline{s}^{bc})}(\overline{s}^{bc} - \overline{s}) + \ldots$$
$$\overline{v} - Dg|_{(\overline{s}^l - \overline{s}^{bc})}(\overline{s}^{bc} - \overline{s}) \leq g(\overline{s}^l - \overline{s}^{bc}).$$

Some embodiments may include a calculation of the derivative Dg, however, in other embodiments a simpler inequality may be obtained by dropping the term in Dg is sufficient:

$$\overline{v} \leq g(\overline{s}^l - \overline{s}^{bc})$$

$$c\_v\_x_0 x_n + c\_v\_u\overline{u} \leq g(\overline{s}^l - \overline{s}^{bc})$$

$$c\_v\_u\overline{u} \leq g(\overline{s}^l - \overline{s}^{bc}) - c\_v\_x_0 x_n.$$

The statement about "sufficiency" is not proven analytically but based on co-simulation with traffic simulator and optimizer—with and without a physical vehicle in the loop. Note that these equations may provide pre-computed tables for Dg that could be employed, if necessary.

It may be assumed that the current signal phase (green or red) and the time remaining in the phase are available. For traffic-actuated signals, the time remaining in the green phase may get extended. The time remaining in the red phase is usually unknown; we assume that the signal will remain red for the entire planning horizon. Note that for our purposes, we need to know the signal phase only over the planning horizon $t_h$.

If the current phase of the signal is green, then it is desirable to pass through the signal without stopping. This may be cast as a location constraint by requiring that the subject vehicle be beyond the location of the signal at the time the signal turns red. The last statement applies only if the signal phase will change during the planning horizon $t_h$, otherwise no/vacuous signal constraint may be imposed:

$$s_{n+k} \geq s^{sig}$$

$$[c\_s\_x_0](k,)x_n + [c\_s\_u](k,)\overline{u} \geq s^{sig}$$

$$-[c\_s\_u](k,)\overline{u} \leq +[c\_s\_x_0](k,)x_n - s^{sig}$$

where $k = \lfloor t^{g \to r}/t_s \rfloor$, $1 \leq k \leq N$. This constraint is incorporated by extracting the k-th rows of the transition matrices. Note that only the nearest signal is incorporated; however, if multiple closely-spaced signals exist and will change from green to red during the planning horizon $t_h$, then a straightforward extension can be made to handle that situation.

It may be that the subject vehicle cannot pass through the signal without stopping if the time remaining in the current green phase is short. This may be dealt with by reversing the sense of the inequality in the above equations:

$$s_{n+k} \leq s^{sig}$$

$$[c\_s\_x_0](k,)x_n + [c\_s\_u](k,)\overline{u} \leq s^{sig}$$

$$[c\_s\_u](k,)\overline{u} \leq -[c\_s\_x_0](k,)x_n + s^{sig}$$

where $k = \lfloor t^{g \to r}/t_s \rfloor$, $1 \leq k \leq N$.

Since the vehicle speed is non-negative, satisfying the said constraint at n+k guarantees that it is also satisfied at n+k+1, . . . . Note that doing this fixes the number of inequality constraints, which may be a consideration for real-time implementation.

If the signal is already red, it may be assumed that the signal will remain so through the planning horizon $t_h$ to obtain:

$$s_{n+N} \leq s^{sig}$$

$$[c\_s\_x_0](N,)x_n + [c\_s\_u](N,)\overline{u} \leq s^{sig}$$

$$[c\_s\_u](N,)\overline{u} \leq -[c\_s\_x_0](N,)x_n + s^{sig}$$

Note that the only difference between these equations is that the former uses k-th ($1 \leq k \leq N$) row of the transition matrices while the latter always uses the last row. In one embodiment, k=N may be used to stop at the signal regardless of whether the signal is currently green or red.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. Vehicle controller circuitry for a subject vehicle, comprising:
    vehicle constraint determination circuitry to determine vehicle constraints including predicted values for vehicle speed of at least one other vehicle and predicted values of for vehicle position of the at least one other vehicle relative to the subject vehicle, wherein the vehicle constraints are determined at predetermined time steps (k) over a time horizon (Th);
    traffic signal constraint determination circuitry to determine, within a distance horizon (Dh) from the subject vehicle, traffic signal constraints including a green signal state of at least one traffic signal, a distance to the at least one traffic signal relative to the subject vehicle, and a time remaining in the green signal state of the at least one traffic signal; wherein the traffic signal constraints are determined at the predetermined time steps (k) over the time horizon (Th); and acceleration profile (AP) determination circuitry to determine at least one AP for the subject vehicle based on the vehicle constraints, the traffic signal constraints and a minimum safe distance from the at least one other vehicle; wherein each of the at least one AP comprises k number of acceleration values, which when applied to the subject vehicle at each time step k will cause the subject vehicle to travel at a target velocity that is sufficient to pass through the at least one traffic signal while in the green signal state and while maintaining at least the minimum safe distance to the at least one other vehicle; wherein the vehicle constraints determination circuitry also determines the vehicle constraints for a first lane of traffic and the vehicle constraints for a second lane of traffic; wherein the AP determination circuitry also determines at least one lane change for the subject vehicle, which when applied to the subject vehicle will cause the subject vehicle to travel in one of the first or second lanes of traffic at the target velocity that is sufficient to pass through the at least one traffic signal while in the green signal state and while maintaining at least the minimum safe distance to the at least one other vehicle that is also travelling in the one of the first or second lanes.

2. The vehicle controller circuitry of claim 1, wherein the AP determination circuitry also selects an AP, from among a plurality of determined APs, that represents a minimum cost; wherein the cost is a function of acceleration and velocity of the subject vehicle.

3. The vehicle controller circuitry of claim 2, wherein a weighting factor is applied to acceleration, wherein the weighting factor is a scalar value of between 0.01 and 50.

4. The vehicle controller circuitry of claim 1, wherein the target velocity is based on a desired velocity and/or the speed of the at least one other vehicle.

5. The vehicle controller circuitry of claim 1, wherein the traffic signal constraints further include a red signal state of the at least one traffic signal, and wherein the AP determination circuitry also determines a deceleration profile for the subject vehicle based on the red signal state, distance to the at least one traffic signal relative to the subject vehicle and the minimum safe distance to the at least one other vehicle.

6. The vehicle controller circuitry of claim 1, wherein the AP determination circuitry also receives sensor control signals including an override signal indicative of a sudden presence of an object, vehicle or person in front of the subject vehicle, and wherein the AP determination circuitry also causes the subject vehicle to decelerate in response to the override signal.

7. The vehicle controller circuitry of claim 1, wherein the vehicle constraint determination circuitry also receives a signal broadcast from the at least one other vehicle and wherein the vehicle constraints are determined, at least in part, based on the signal broadcast from the at least one other vehicle.

8. The vehicle controller circuitry of claim 7, wherein the signal broadcast from the at least one other vehicle complies with, or is compatible with, a vehicle-to-vehicle (V2V) communications protocol.

9. The vehicle controller circuitry of claim 1, wherein the traffic signal constraint determination circuitry also receives a signal broadcast from the at least one traffic signal and wherein the traffic signal constraints are determined, at least in part, based on the signal broadcast from the at least one traffic.

10. The vehicle controller circuitry of claim 9, wherein the signal broadcast from the at least one traffic signal complies with, or is compatible with, a vehicle-to-infrastructure (V2I) communications protocol.

11. A non-transitory storage device that includes machine-readable instructions that, when executed by one or more processors of a subject vehicle, cause the one or more processors to perform operations, comprising:
   determine vehicle constraints including predicted values for vehicle speed of at least one other vehicle and predicted values of for vehicle position of the at least one other vehicle relative to the subject vehicle, wherein the vehicle constraints are determined at predetermined time steps (k) over a time horizon (Th);
   determine, within a distance horizon (Dh) from the subject vehicle, traffic signal constraints including a green signal state of at least one traffic signal, a distance to the at least one traffic signal relative to the subject vehicle, and a time remaining in the green signal state of the at least one traffic signal; wherein the traffic signal constraints are determined at the predetermined time steps (k) over the time horizon (Th);
   determine at least one AP for the subject vehicle based on the vehicle constraints, the traffic signal constraints and a minimum safe distance from the at least one other vehicle; wherein the at least one AP comprising k number of acceleration values, which when applied to the subject vehicle will cause the subject vehicle to travel at a target velocity that is sufficient to pass through the at least one traffic signal while in the green signal state and while maintaining at least the minimum safe distance to the at least one other vehicle;
   determine the vehicle constraints for a first lane of traffic and the vehicle constraints for a second lane of traffic; and
   determine at least one lane change for the subject vehicle, which when applied to the subject vehicle will cause the subject vehicle to travel in one of the first or second lanes of traffic at the target velocity that is sufficient to pass through the at least one traffic signal while in the green signal state and while maintaining at least the minimum safe distance to the at least one other vehicle that is also travelling in the one of the first or second lanes.

12. The non-transitory storage device of claim 11, wherein the machine-readable instructions that, when executed by one or more processors of a subject vehicle, cause the one or more processors to perform operations, further comprising:
   select an AP, from among a plurality of determined APs, that represents a minimum cost; wherein the cost is a function of acceleration and velocity of the subject vehicle.

13. The non-transitory storage device of claim 12, wherein a weighting factor is applied to acceleration, wherein the weighting factor is a scalar value of between 0.01 and 50.

14. The non-transitory storage device of claim 11, wherein the target velocity is based on a desired velocity and/or the speed of the at least one other vehicle.

15. The non-transitory storage device of claim 11, wherein the traffic signal constraints further include a red signal state of the at least one traffic signal; and wherein the machine-readable instructions that, when executed by one or more processors of a subject vehicle, cause the one or more processors to perform operations, further comprising:
   determine a deceleration profile for the subject vehicle based on the red signal state, distance to the at least one traffic signal relative to the subject vehicle and the minimum safe distance to the at least one other vehicle.

16. The non-transitory storage device of claim 11, wherein the machine-readable instructions that, when executed by one or more processors of a subject vehicle, cause the one or more processors to perform operations, further comprising:
   receive sensor control signals including an override signal indicative of a sudden presence of an object, vehicle or person in front of the subject vehicle, and to determine a deceleration profile that, when applied to the subject vehicle will cause the subject vehicle to decelerate in response to the override signal to avoid collision with the object, vehicle or person.

17. The non-transitory storage device of claim 11, wherein the machine-readable instructions that, when executed by one or more processors of a subject vehicle, cause the one or more processors to perform operations, further comprising:
   receive a signal broadcast from the at least one other vehicle and wherein the vehicle constraints are determined, at least in part, based on the signal broadcast from the at least one other vehicle.

18. The non-transitory storage device of claim 17, wherein the signal broadcast from the at least one other vehicle complies with, or is compatible with, a vehicle-to-vehicle (V2V) communications protocol.

19. The non-transitory storage device of claim 11, wherein the machine-readable instructions that, when executed by one or more processors of a subject vehicle, cause the one or more processors to perform operations, further comprising:
   receive a signal broadcast from the at least one traffic signal and wherein the traffic signal constraints are determined, at least in part, based on the signal broadcast from the at least one traffic.

20. The non-transitory storage device of claim 19, wherein the signal broadcast from the at least one traffic signal complies with, or is compatible with, a vehicle-to-infrastructure (V2I) communications protocol.

21. A method for controlling a subject vehicle, comprising:
- determining vehicle constraints including predicted values for vehicle speed of at least one other vehicle and predicted values of for vehicle position of the at least one other vehicle relative to the subject vehicle, wherein the vehicle constraints are determined at predetermined time steps (k) over a time horizon (Th);
- determining, within a distance horizon (Dh) from the subject vehicle, traffic signal constraints including a green signal state of at least one traffic signal, a distance to the at least one traffic signal relative to the subject vehicle, and a time remaining in the green signal state of the at least one traffic signal; wherein the traffic signal constraints are determined at the predetermined time steps (k) over the time horizon (Th);
- determining at least one AP for the subject vehicle based on the vehicle constraints, the traffic signal constraints and a minimum safe distance from the at least one other vehicle;
- wherein the at least one AP comprising k number of acceleration values, which when applied to the subject vehicle will cause the subject vehicle to travel at a target velocity that is sufficient to pass through the at least one traffic signal while in the green signal state and while maintaining at least the minimum safe distance to the at least one other vehicle
- determining the vehicle constraints for a first lane of traffic and the vehicle constraints for a second lane of traffic; and
- determining at least one lane change for the subject vehicle, which when applied to the subject vehicle will cause the subject vehicle to travel in one of the first or second lanes of traffic at the target velocity that is sufficient to pass through the at least one traffic signal while in the green signal state and while maintaining at least the minimum safe distance to the at least one other vehicle that is also travelling in the one of the first or second lanes.

22. The method of claim 21, further comprising:
- selecting an AP, from among a plurality of determined APs, that represents a minimum cost; wherein the cost is a function of acceleration and velocity of the subject vehicle.

23. The method of claim 22, further comprising:
- applying a weighting factor to acceleration, wherein the weighting factor is a scalar value of between 0.01 and 50.

24. The method of claim 21, wherein the traffic signal constraints further include a red signal state of the at least one traffic signal; and wherein the method further comprising:
- determining a deceleration profile for the subject vehicle based on the red signal state, distance to the at least one traffic signal relative to the subject vehicle and the minimum safe distance to the at least one other vehicle.

25. The method of claim 21, further comprising:
- receiving sensor control signals including an override signal indicative of a sudden presence of an object, vehicle or person in front of the subject vehicle; and
- determining a deceleration profile that, when applied to the subject vehicle will cause the subject vehicle to decelerate in response to the override signal to avoid collision with the object, vehicle or person.

26. The method of claim 21, further comprising:
- receiving a signal broadcast from the at least one other vehicle; wherein the vehicle constraints are determined, at least in part, based on the signal broadcast from the at least one other vehicle; and wherein the signal broadcast from the at least one other vehicle complies with, or is compatible with, a vehicle-to-vehicle (V2V) communications protocol; and
- receiving a signal broadcast from the at least one traffic signal; wherein the traffic signal constraints are determined, at least in part, based on the signal broadcast from the at least one traffic; and wherein the signal broadcast from the at least one traffic signal complies with, or is compatible with, a vehicle-to-infrastructure (V2I) communications protocol.

* * * * *